(12) United States Patent
Toyoda et al.

(10) Patent No.: US 8,105,191 B2
(45) Date of Patent: Jan. 31, 2012

(54) CONTROL APPARATUS AND METHOD FOR CONTINUOUSLY VARIABLE TRANSMISSIONS

(75) Inventors: Shinya Toyoda, Nisshin (JP); Hiroji Taniguchi, Okazaki (JP); Yoshinobu Soga, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 393 days.

(21) Appl. No.: 11/808,545

(22) Filed: Jun. 11, 2007

(65) Prior Publication Data

US 2007/0298918 A1 Dec. 27, 2007

(30) Foreign Application Priority Data

Jun. 15, 2006 (JP) .................................. 2006-166710

(51) Int. Cl.
*F16H 61/66* (2006.01)
(52) U.S. Cl. ................ 474/28; 474/12; 474/18; 474/17; 477/38; 477/44; 477/45; 477/46; 701/51; 701/95
(58) Field of Classification Search ..................... 474/28
See application file for complete search history.

(56) References Cited

U.S. PATENT DOCUMENTS

| | | | | |
|---|---|---|---|---|
| 6,007,452 A * | 12/1999 | Sawada et al. | ................... | 477/45 |
| 6,138,070 A * | 10/2000 | Shimanaka et al. | ............. | 701/51 |
| 6,849,030 B2 * | 2/2005 | Yamamoto et al. | ............ | 477/159 |
| 2004/0063538 A1* | 4/2004 | Yamamoto et al. | ............. | 477/45 |
| 2005/0221929 A1* | 10/2005 | Oshita et al. | ..................... | 474/28 |
| 2006/0063641 A1* | 3/2006 | Oshita et al. | ..................... | 477/44 |
| 2006/0229156 A1* | 10/2006 | Suzuki et al. | .................... | 477/37 |

FOREIGN PATENT DOCUMENTS

| | | |
|---|---|---|
| EP | 1 394 444 A2 | 3/2004 |
| EP | 1 403 563 A2 | 3/2004 |
| JP | A-02-120555 | 5/1990 |
| JP | A-07-158706 | 6/1995 |
| JP | B2-2728466 | 12/1997 |
| JP | A-11-013874 | 1/1999 |
| JP | A-11-030321 | 2/1999 |
| JP | A-2004-084749 | 3/2004 |
| JP | A-2004-092809 | 3/2004 |
| JP | A-2006-144974 | 6/2006 |

OTHER PUBLICATIONS

European Patent Office, *European Search Report for EP 07252429.1*, dated Feb. 8, 2010, pp. 1-4.

* cited by examiner

*Primary Examiner* — Robert Siconolfi
*Assistant Examiner* — San Aung
(74) *Attorney, Agent, or Firm* — Oliff & Berridge, PLC

(57) ABSTRACT

The line hydraulic pressure setting portion sets the line hydraulic pressure $P_L$, which is the base pressure for the required shift control pressure Pin and the required belt clamping pressure Pd, based on the higher of the required pressures Pin and Pd. At this time, if the continuously variable transmission is to be shifted up, the required Pin calculating portion calculates the required shift control pressure Pin based on one of the target speed ratio $\gamma^*$ and the actual speed ratio $\gamma$ with which the required shift pressure Pv is calculated to be higher than with the other. As such, the required shift control pressure Pin is set to the minimum necessary level for shifting up the continuously variable transmission and the line hydraulic pressure $P_L$ is appropriately set to a level for obtaining the required shift control pressure Pin.

8 Claims, 9 Drawing Sheets

CONTROL APPARATUS AND METHOD FOR CONTINUOUSLY VARIABLE TRANSMISSIONS

INCORPORATION BY REFERENCE

The disclosure of Japanese Patent Application No. 2006-166710 filed on Jun. 15, 2006 including the specification, drawings and abstract is incorporated herein by reference in its entirety.

BACKGROUND OF THE INVENTION

1. Field of the Invention

The invention relates to a control apparatus and a control method for a belt-type continuously variable transmission having a pair of variable effective diameter pulleys that are actuated by hydraulic cylinders and a transmission belt wound around the pulleys. In particular, the invention relates to a technology for setting the base pressure for the hydraulic pressure of each hydraulic cylinder.

2. Description of the Related Art

As is widely known, a control apparatus for controlling a belt-type continuously variable transmission having a pair of variable effective diameter pulleys that are actuated by hydraulic cylinders and a transmission belt wound around the pulleys needs to set the base pressure for the hydraulic pressure of each hydraulic cylinder appropriately.

For example, JP2728466 describes a hydraulic pressure control apparatus for a hydraulically-driven transmission. The transmission recited in this patent is a continuously variable transmission that has a primary pulley, a secondary pulley, and a belt wound around the primary and secondary pulleys. The speed ratio of the continuously variable transmission is controlled by operating the primary pulley so as to archive the target speed ratio. At this time, the force for clamping the belt (belt clamping force) is controlled by operating the secondary pulley so as to prevent slipping between the primary pulley and the belt and slipping between the secondary pulley and the belt. The hydraulic pressure control apparatus descried controls the line hydraulic pressure that is the base pressure for the hydraulic pressure of the hydraulic chamber for the primary pulley (will hereinafter be referred to as "primary hydraulic pressure") and the hydraulic pressure of the hydraulic chamber for the secondary pulley (will hereinafter be referred to as "secondary hydraulic pressure") based on the input torque and the speed ratio of the continuously variable transmission. That is, in this way, the hydraulic pressure control apparatus improves the shift response, prevents slipping of the belt, and increases the power transmission efficiency.

The hydraulic pressure control apparatus has a hydraulic circuit that supplies the line hydraulic pressure directly to the secondary-pulley side hydraulic chamber, and thus the line hydraulic pressure and the secondary hydraulic pressure are substantially equal to each other. Therefore, although the line hydraulic pressure can be set to a level that is required to change the width of the groove of the secondary pulley appropriately, there is a possibility that the line hydraulic pressure fails to be set to a level required for the primary hydraulic pressure, and it may deteriorate the shift response of the continuously variable transmission.

To cope with this, one option is to have a hydraulic circuit that through which the line hydraulic pressure can be controlled independent of the primary and secondary hydraulic pressures and control the line hydraulic pressure based on the primary and secondary hydraulic pressures. In general, in a belt-type continuously variable transmission, the secondary hydraulic pressure is directly adjusted to the target value while the primary hydraulic pressure is built up as a result of the continuously variable transmission being shifted and the belt clamping pressure being produced through the control of the flow rate of hydraulic fluid to and from the primary pulley side hydraulic chamber. As such, when setting the line hydraulic pressure, it is necessary to estimate the value of the primary hydraulic pressure and use it for the setting of the line hydraulic pressure, while the set value of the secondary hydraulic pressure is used as it is.

The primary hydraulic pressure is a hydraulic pressure that is needed to maintain the speed ratio constant and to change the speed ratio. The primary hydraulic pressure can be calculated based on, for example, the belt clamping pressure, the speed ratio, and the rate of change in the speed ratio (the speed ratio changing rate). For example, when the continuously variable transmission is to be shifted up by supplying the hydraulic fluid to the primary-pulley side hydraulic chamber, the value of the primary hydraulic pressure that is needed to reduce the width of the groove of the primary pulley as required is calculated by adding a required shift pressure, which is the hydraulic pressure for producing the thrust force for changing the groove width of the primary pulley to change the speed ratio, to a steady balance pressure, which is the hydraulic pressure for maintaining the speed ratio constant.

In the case where the required shift pressure is calculated using the rate of change in the target speed ratio as the speed ratio changing rate, when the actual speed ratio is lagging behind the target speed ratio while the continuously variable transmission is being shifted up, the required shift pressure for the upshift may be zeroed despite the fact that the upshift of the continuously variable transmission is sill ongoing. In this case, the hydraulic pressure for the upshift is not sufficient, and this may reduce the followability to the target speed ratio and thus delay the completion of the upshift.

On the other hand, in the case where the required shift pressure is calculated using the rate of change in the actual speed ratio as the speed ratio changing rate, when the actual speed ratio is lagging behind the target speed ratio while the continuously variable transmission is being shifted up, the required shift pressure for the upshift may be made relatively small in calculation. In this case, too, the hydraulic pressure for the upshift is not sufficient, and this may reduce the followability to the target speed ratio and thus the shift response.

In order to avoid such reduction of the followability to the target speed ratio, the line hydraulic pressure needs to be set high with respect to the required primary hydraulic pressure. In this case, however, the line hydraulic pressure may be made higher than necessary, and it may reduce the fuel economy.

SUMMARY OF THE INVENTION

It is an object of the invention to provide a control apparatus and a control method for a belt type continuously variable transmission that appropriately calculate the hydraulic pressure of the hydraulic cylinder for the primary pulley, which is used to set the line hydraulic pressure when shifting up the continuously variable transmission.

A first aspect of the invention relates to a control apparatus for a belt type continuously variable transmission that is provided on a power transmission path between a drive power source and drive wheels in a vehicle and has a primary pulley, a secondary pulley, a belt that is wound around the primary pulley and the secondary pulley, a primary-pulley-side hydraulic cylinder that is used to change the width of the groove of the primary pulley, and a secondary-pulley-side hydraulic cylinder that is used to change the width of the groove of the secondary pulley. The control apparatus changes the speed ratio of the continuously variable transmission by operating the primary-pulley-side hydraulic cylinder so as to eliminate a deviation between a target speed ratio related value and an actual speed ratio related value, and the control apparatus controls the belt clamping force by operating the secondary-pulley-side hydraulic cylinder so as to prevent slipping between the belt and the primary pulley and slipping between the belt and the secondary pulley. The control apparatus includes: a base pressure setting portion that sets the base pressure for the hydraulic pressure of the primary-pulley-side hydraulic cylinder and the hydraulic pressure of the secondary-pulley-side hydraulic cylinder based on the hydraulic pressure of the primary-pulley-side hydraulic cylinder and the hydraulic pressure of the secondary-pulley-side hydraulic cylinder; and a primary hydraulic pressure calculating portion that, when the continuously variable transmission is to be shifted up, calculates the hydraulic pressure of the primary-pulley side hydraulic cylinder based on one of the target speed ratio related value and the actual speed ratio related value with which the hydraulic pressure of the primary-pulley side hydraulic cylinder is calculated to be higher than with the other.

According to the control apparatus described above, when the base pressure setting portion sets the base pressure for the hydraulic pressures of the primary-pulley-side hydraulic cylinder and the secondary-pulley-side hydraulic cylinder based on the hydraulic pressures in the primary-pulley-side hydraulic cylinder and the secondary-pulley-side hydraulic cylinder, the primary hydraulic pressure calculating portion calculates the hydraulic pressure of the primary-pulley-side hydraulic pressure based on one of the target speed ratio related value and the actual speed ratio related value with which the hydraulic pressure of the primary-pulley-side hydraulic cylinder is calculated to be higher than with the other. Thus, the hydraulic pressure of the primary-pulley-side hydraulic cylinder can be set to the minimum necessary level for shifting up the continuously variable transmission and the base pressure can be appropriately set to the level required to obtain the set hydraulic pressure of the primary-pulley-side hydraulic cylinder.

The control apparatus according to the first aspect of the invention may be such that the base pressure setting portion sets the base pressure using a predetermined limit value as the upper limit of the base pressure so that the base pressure does not exceed the allowable load of the belt. According to this structure, even if the hydraulic pressure of the primary-pulley-side hydraulic cylinder becomes very high while the target speed ratio related value is being changed in steps, the hydraulic pressure of the primary-pulley-side hydraulic cylinder is prevented from being increased to an excessive level, which is for example a level higher than the allowable load of the transmission belt.

Further, the control apparatus according to the first aspect of the invention may be such that the hydraulic pressure of the primary-hydraulic cylinder is comprised of a steady balance pressure used for maintaining the speed ratio and a required shift pressure used for changing the speed ratio and the primary hydraulic pressure calculating portion calculates the required shift pressure by applying the higher of the rate of change in the target speed ratio related value and the rate of change in the actual speed ratio related value to a prestored arithmetic expression for calculating the required shift pressure. According to this structure, the hydraulic pressure of the primary-pulley-side hydraulic cylinder can be appropriately calculated.

The speed ratio related value is, for example, a parameter having a one-to-one relation with the speed ratio (input rotation speed/output rotation speed) of the belt-type continuously variable transmission. However, the speed ratio related value may alternatively be other value, such as the input rotation speed (the rotation speed on the drive power source side) corresponding to the vehicle speed, the output rotation speed (the rotation speed on the drive wheel side), and so on, the engine speed, and the turbine speed, as well as the speed ratio itself.

Further, in the normal shift control of the continuously variable transmission, various controls may be performed, such as feedback control of the speed ratio in which the target speed ratio is determined based on predetermined shift conditions and the groove width of the primary pulley is changed by supplying hydraulic fluid to or discharging hydraulic fluid from the primary-pulley-side hydraulic cylinder, and feedback control of the speed ratio in which the target rotation speed of the input side (driver power source side) of the continuously variable transmission is determined in accordance with the vehicle speed and the output rotation speed (drive wheel side rotation speed) and the groove width of the primary pulley is changed such that the actual input rotation speed of the continuously variable transmission equals the target rotation speed.

The predetermined shift conditions may be set using a map, an arithmetic expression, or the like, in which values indicating the operation conditions of the vehicle, such as the accelerator operation amount and the output (acceleration amount) required by the driver, and the vehicle speed (corresponding to the output rotation speed), are used as parameters.

Further, the drive power source for propelling the vehicle may be any kind of an internal combustion engine, such as gasoline engines and diesel engines. Further, as an auxiliary drive power source for propelling the vehicle, an electric motor or the like may be provided in addition to the internal combustion engine. Alternatively, the drive power source may be constituted by an electric motor or motors only.

A second aspect of the invention relates to a control method for a belt type continuously variable transmission that is provided on a power transmission path between a drive power source and drive wheels in a vehicle and has a primary pulley, a secondary pulley, a belt that is wound around the primary pulley and the secondary pulley, a primary-pulley-side hydraulic cylinder that is used to change the width of a groove of the primary pulley, and a secondary-pulley-side hydraulic cylinder that is used to change the width of a groove of the secondary pulley. In this control method, the speed ratio of the continuously variable transmission is changed by operating the primary-pulley-side hydraulic cylinder so as to eliminate the deviation between a target speed ratio related value and an actual speed ratio related value and the belt clamping force is controlled by operating the secondary-pulley-side hydraulic cylinder so as to prevent slipping between the belt and the primary pulley and slipping between the belt and the secondary pulley. In the control method, the base pressure for the hydraulic pressure of the primary-pulley-side hydraulic cylinder and the hydraulic pressure of the secondary-pulley-side hydraulic cylinder is set based on the hydraulic pressure of the primary-pulley-side hydraulic cylinder and the hydraulic pressure of the secondary-pulley-side hydraulic cylinder, and when the continuously variable transmission is to be shifted up, the hydraulic pressure of the primary-pulley side hydraulic cylinder is calculated based on one of the target speed ratio related value and the actual speed ratio related value with which the hydraulic pressure of the primary-pulley side hydraulic cylinder is calculated to be higher than with the other.

The control method according to the second aspect of the invention may be such that the base pressure is set using a predetermined limit value as the upper limit of the base pressure so that the base pressure does not exceed the allowable load of the belt.

Further, the control method according to the second aspect of the invention may be such that a required shift pressure that is used for changing the speed ratio and is a part of the hydraulic pressure of the primary-hydraulic cylinder is calculated by applying the higher of the rate of change in the target speed ratio related value and the rate of change in the actual speed ratio related value to a prestored arithmetic expression for calculating the required shift pressure.

BRIEF DESCRIPTION OF THE DRAWINGS

The foregoing and further objects, features and advantages of the invention will become apparent from the following description of preferred embodiments with reference to the accelerator operation amount accompanying drawings, wherein like numerals are used to represent like elements and wherein.

DETAILED DESCRIPTION OF THE EXEMPLARY EMBODIMENTS

Hereinafter, exemplary embodiments of the invention will be described in detail with reference to the accompanying drawings.

Figure 1:
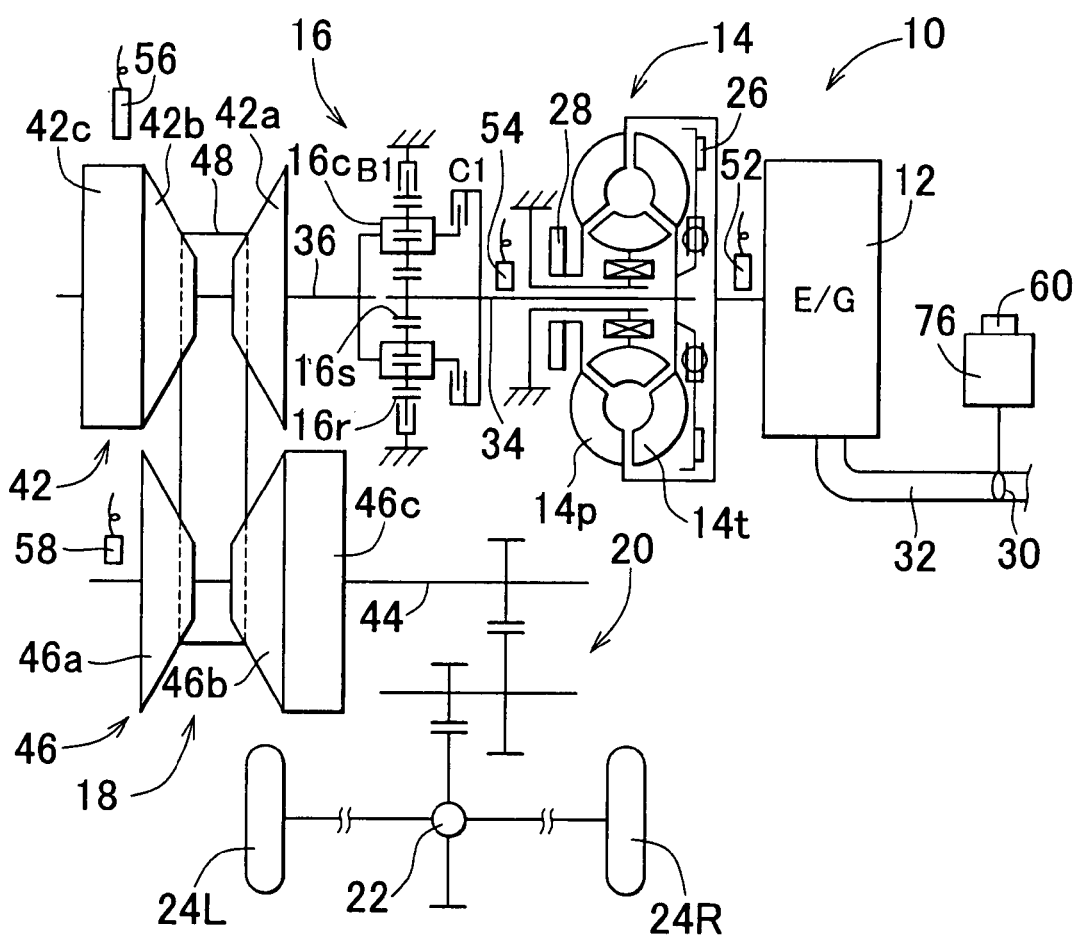
FIG. 1 is a view schematically showing the configuration of a vehicle drive apparatus to which the invention has been applied.

FIG. 1 is a view schematically showing the configuration of a vehicle drive apparatus 10 to which the invention has been applied. The vehicle drive apparatus 10 is a transverse-mounted automatic transmission that is preferably used in FF (Front-engine Front-drive) vehicles. The vehicle includes an engine 12 that is the drive power source for propelling the vehicle. The output of the engine 12, which is an internal combustion engine, is transmitted to left and right drive wheels 24L, 24R via the crankshaft of the engine 12, a torque converter 14 that is a fluid-type transmission device, a forward-reverse drive switching device 16, a belt-type continuously variable transmission (CVT) 18, a reduction gear unit 20, and a deferential unit 22.

The torque converter 14 has a pump impeller 14$p$ that is coupled with the crankshaft of the engine 12 and a turbine impeller 14$t$ that is coupled with the forward-reverse drive switching device 16 via a turbine shaft 34 that is the output portion of the torque converter 14. The torque converter 14 transmits driver power via fluid. Further, a lock-up clutch 26 is provided between the pump impeller 14$p$ and the turbine impeller 14$t$. The lock-up clutch 26 is engaged and released as hydraulic pressure is selectively supplied to an engagement side hydraulic chamber and to a release side hydraulic chamber via a lock-up control valve (L/C control valve) in a hydraulic control circuit 100 (Refer to FIG. 2 and FIG. 3). Note that the lock-up control valve is not shown in the drawings. When the lock-up clutch 26 is fully engaged, the pump impeller 14$p$ and the turbine impeller 14$t$ rotate together. The pump impeller 14$p$ is coupled with a mechanical oil pump 28 that produces hydraulic pressure by being rotated by the engine 12. The hydraulic pressure produced by the oil pump 28 is used to control the shifting of the continuously variable transmission 18, produce the force for clamping the belt of the continuously variable transmission 18, engage and release the lock-up clutch 26, and lubricate the respective portions.

The forward-reverse drive switching device 16 is mainly constituted by a double-pinion type planetary gearset. The turbine shaft 34 of the torque converter 14 is coupled with a sun gear 16$s$ of the forward-reverse drive switching device 16. An input shaft 36 of the continuously variable transmission 18 is coupled with a carrier 16$c$ of the forward-reverse drive switching device 16. The carrier 16$c$ and the sun gear 16$s$ are selectively connected to each other via a forward-drive clutch C1. A ring gear 16$r$ of the forward-reverse drive switching device 16 is selectively held by the housing via a reverse-drive brake B1. The forward-drive clutch C1 and the reverse-drive brake B1 are hydraulically-driven friction coupling devices that are frictionally engaged by hydraulic cylinders and serve as intermittent connection devices.

When the forward-drive clutch C1 is engaged and the reverse-drive brake B1 is released, a forward drive power transmission path is established in which the turbine shaft 34 and the input shaft 36 are directly connected to each other, and the entire part of the forward-reverse drive switching device 16 rotates to transmit the forward drive power to the continuously variable transmission 18 side. On the other hand, when the reverse-drive brake B1 is engaged and the forward-drive clutch C1 is released, a reverse-drive power transmission path is established in the forward-reverse drive switching device 16, and the input shaft 36 is rotated in the direction opposite to the turbine shaft 34 whereby the reverse drive force is transmitted to the continuously variable transmission 18 side. When the forward-drive clutch C1 and the reverse-drive brake B1 are both released, the forward-reverse drive switching device 16 is in a neutral state in which the power transmission is interrupted.

The continuously variable transmission 18 has an input side variable pulley (primary pulley) 42 that is an input member provided on the input shaft 36, an output side variable pulley (secondary pulley) 46 that is an output member provided on an output shaft 44, and a transmission belt 48 that is wound around the input side variable pulley 42 and the output side variable pulley 46. The effective diameters of the variable pulleys 42, 46 are variable. Drive power is transmitted through the frictional force between the input side variable pulley 42 and the transmission belt 48 and through the frictional force between the output side variable pulley 46 and the transmission belt 48.

The input side variable pulley 42 has a stationary rotor 42a that is fixed on the input shaft 36 and a movable rotor 42b that is provided on the input shaft 36. The movable rotor 42b is not rotatable relative to the input shaft 36 but is slidable in the axial direction of the input shaft 36. Also, the input side variable pulley 42 has an input side hydraulic cylinder (primary pulley side hydraulic cylinder) 42c that produces a thrust force for changing the width of the V-shaped groove between the stationary rotor 42a and the movable rotor 42b. Likewise, the output side variable pulley 46 has a stationary rotor 46a that is fixed on the output shaft 44 and a movable rotor 46b that is provided on the output shaft 44. The movable rotor 46b is not rotatable relative to the output shaft 44 but is slidable in the axial direction of the output shaft 44. Also, the output side variable pulley 46 has an input side hydraulic cylinder (secondary pulley side hydraulic cylinder) 46c that produces a thrust force for changing the width of the V-shaped groove between the stationary rotor 46a and the movable rotor 46b. By controlling the flow rates of hydraulic fluids supplied to and discharged from the input side hydraulic cylinder 42c by means of the hydraulic control circuit 100, the widths of the V-shaped grooves of the input side variable pulley 42 and the output side variable pulley 46 are changed, whereby the pitch diameters of the transmission belt 48 at the input side variable pulley 42 and at the output side variable pulley 46 (i.e., effective diameters of the input side variable pulley 42 and the output side variable pulley 46) change, so that the speed ratio $\gamma$ (=input shaft rotation speed $N_{IN}$/output shaft rotation speed $N_{OUT}$) continuously changes. Also, the hydraulic pressure of the output side hydraulic cylinder 46c (belt clamping pressure Pd) is controlled by the hydraulic control circuit 100 so that the transmission belt 48 does not slip. As a result of such control, the hydraulic pressure of the input side hydraulic cylinder 42c (shift control pressure Pin) is built up.

Figure 2:
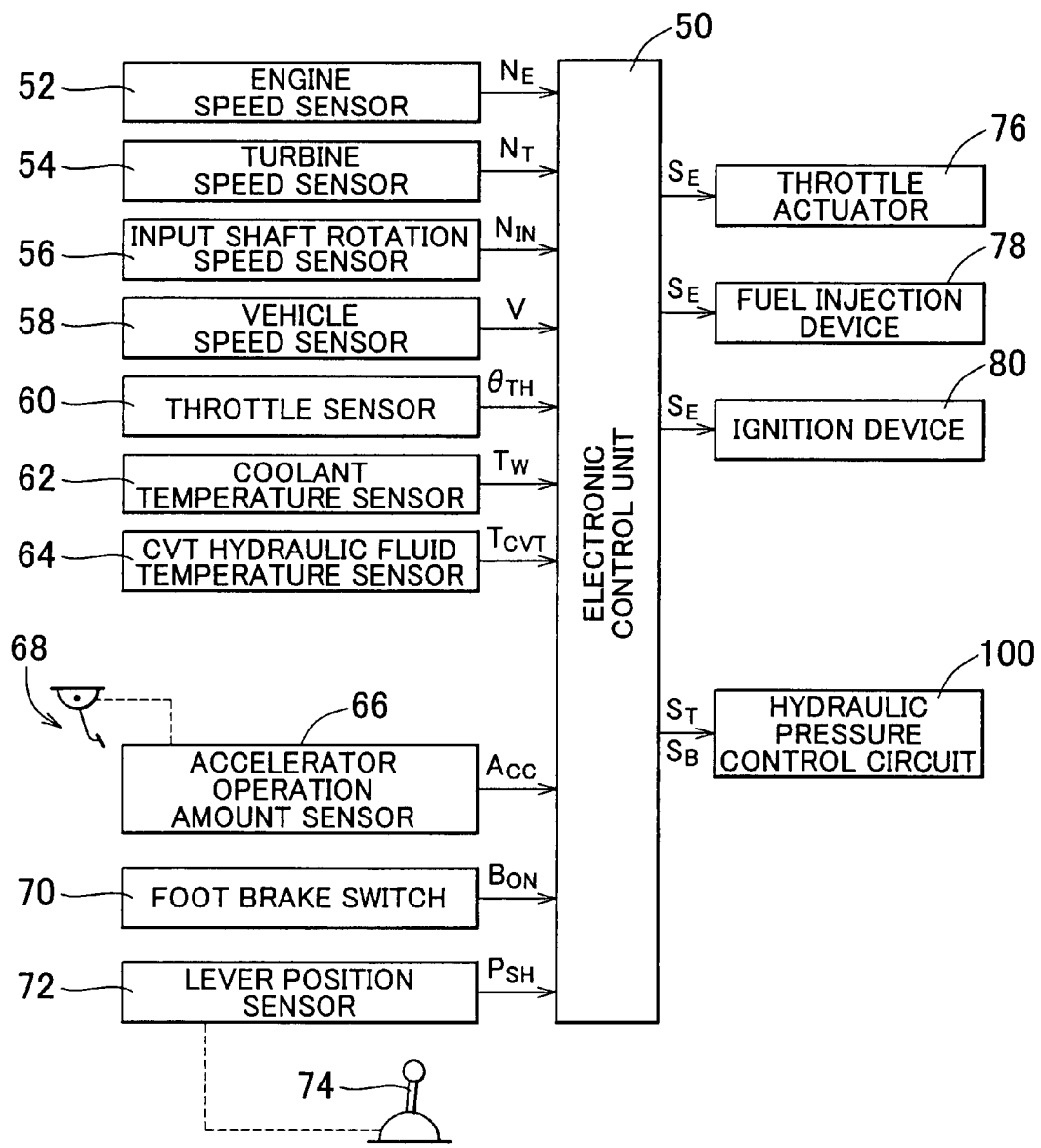
FIG. 2 is a block diagram showing the main components and sections of the control system that is incorporated in the vehicle to control the vehicle drive apparatus shown in FIG. 1 and other components.

FIG. 2 is a block diagram showing the main components and sections of the control system that is incorporated in the vehicle to control the vehicle drive apparatus 10, and other components. Referring to FIG. 2, an electronic control unit 50 is constituted by a so-called microcomputer that includes, for example, a CPU, RAM, ROM, input interface, output interface, and so on. The CPU performs the output control of the engine 12, the shifting control of the continuously variable transmission 18, the control of the belt clamping pressure, etc. by performing signal processing on various programs pre-stored in the ROM while using the temporary memory function of the RAM. The CPU may include separate sections for the respective controls, such as the engine control and the hydraulic control for the continuously variable transmission 18 and the lock-up clutch 26.

The electronic control unit 50 receives various signals such as: signals indicating the rotational angle (position) $A_{CR}$ (°) of the crankshaft and the rotation speed (engine speed) $N_E$ of the engine 12, which are detected by an engine speed sensor 52; signals indicating the rotation speed (turbine speed) $N_T$ of the turbine shaft 34 that is detected by a turbine speed sensor 54; signals indicating the rotation speed (input shaft rotation speed) $N_{IN}$ of the continuously variable transmission 18 (i.e., the input rotation speed of the continuously variable transmission 18) which is detected by an input shaft rotation speed sensor 56; signals indicating the rotation speed (output shaft rotation speed) $N_{OUT}$ of the output shaft 44 (the output rotation speed of the continuously variable transmission 18), i.e., signals indicating the vehicle speed V corresponding to the output shaft rotation speed $N_{OUT}$, which is detected by a vehicle speed sensor (output shaft rotation speed sensor) 58; signals indicating the throttle opening degree $\theta_{TH}$ of an electronic throttle valve 30 in the intake passage 32 of the engine 12 (Refer to FIG. 1), which is detected by a throttle sensor 60; signals indicating the temperature $T_W$ of the coolant of the engine 12 which is detected by a coolant temperature sensor 62; signals indicating the temperature $T_{CVT}$ of the hydraulic fluid circulated through the hydraulic circuits of the continuously variable transmission 18 and others, which is detected by a CVT hydraulic temperature sensor 64; accelerator operation amount signals indicating the operation amount Acc of an accelerator pedal 68 which is detected by an accelerator operation amount sensor 66; brake operation signals indicating the operation $B_{ON}$ of a foot brake serving as the regular brake of the vehicle (i.e., signals indicating whether the foot brake is being operated), which is detected by a foot brake switch 70; and shift lever position signals indicating the position (operation position) of a shift lever 74 which is detected by a lever position sensor 72.

On the other hand, the electronic control unit 50 outputs engine output control command signals $S_E$ that include, for example, throttle signals for driving a throttle actuator 76 for opening and closing the electronic throttle valve 30 and injection signals for controlling the amount of fuel to be injected from a fuel injection device 78, and ignition timing signals for controlling the timing of ignitions by an ignition device 80 in the engine 12. Also, the electronic control unit 50 outputs various signals to the hydraulic control circuit 100, such as shift control command signals $S_T$ for changing the speed ratio $\gamma$ of the continuously variable transmission 18 (e.g., command signals for driving solenoid valves DS1 and DS2 for controlling the flow rate of the hydraulic fluid supplied to the input side hydraulic cylinder 42c), clamping force control command signals $S_B$ for adjusting the clamping force of the transmission belt 48 (e.g., command signals for driving a linear solenoid valve SLS for adjusting a line hydraulic pressure $P_L$), and line hydraulic pressure control command signals $S_{PL}$ (e.g., command signals for driving a linear solenoid valve SLT for adjusting the line hydraulic pressure $P_L$).

Figure 3:
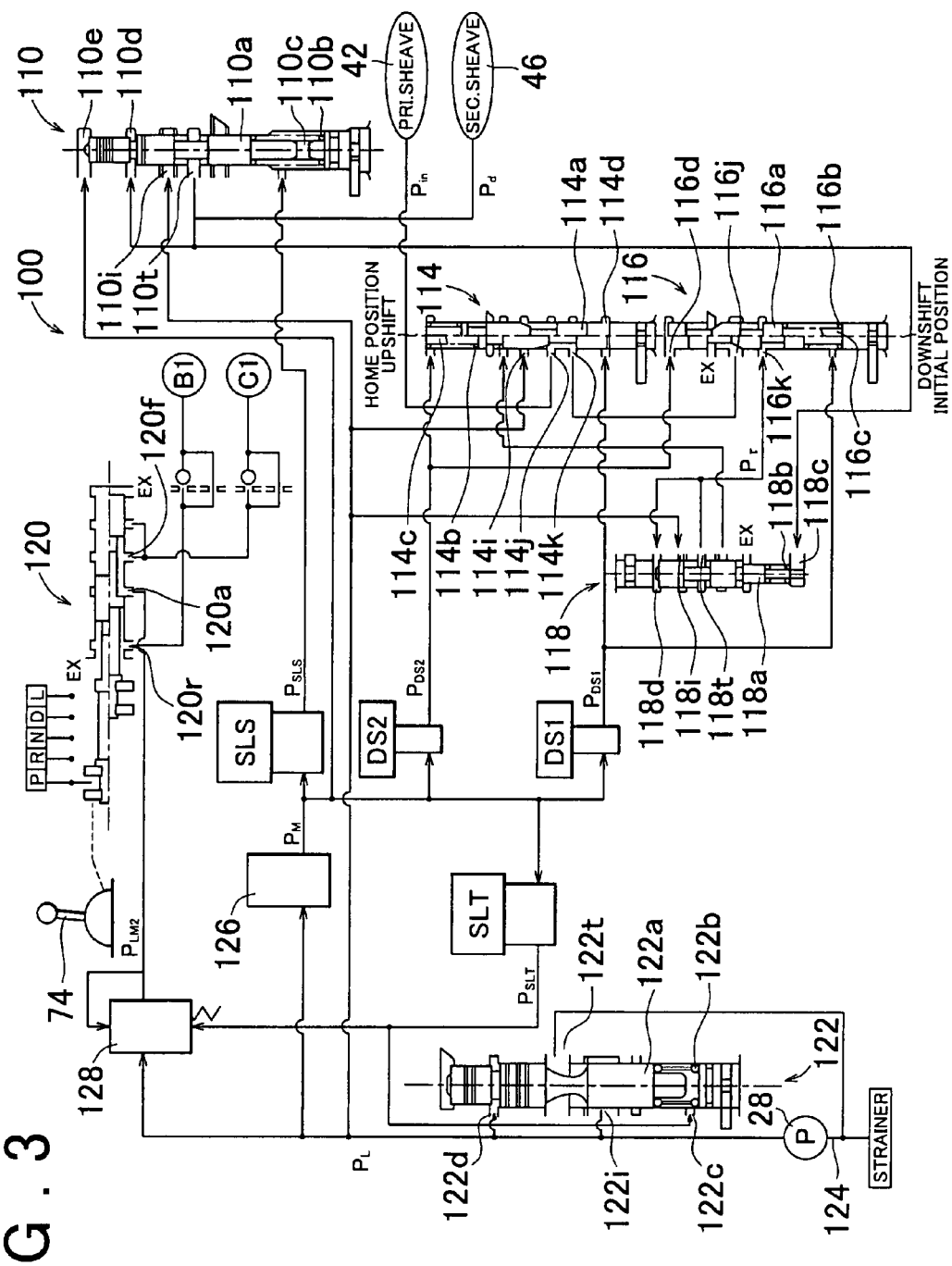
FIG. 3 is a hydraulic circuit diagram showing the sections of the hydraulic control circuit that are related to the belt clamping force control, the speed ratio control, and the control of hydraulic pressures for engaging the forward-drive clutch and the reverse-drive brake according to the operation of the shift lever.

The shift lever 74 is provided near the driver's seat and is manually operated to a selected one of the five lever positions "P", "R", "N", "D", and "L" that are arranged in this order (Refer to FIG. 3).

The "P" position ("P" range) is a parking position at which the vehicle drive apparatus 10 is placed in a neutral state in which the power transmission path in the vehicle drive apparatus 10 is disconnected, that is, the power transmission through the vehicle drive apparatus 10 is interrupted, and the output shaft 44 is mechanically locked by a mechanical parking mechanism so as not to rotate. The "R" position is a reverse drive position in which the rotational direction of the output shaft 44 is reversed. The "N" position is a neutral position in which the power transmission through the vehicle drive apparatus 10 is interrupted. The "D" position is a forward drive position in which an automatic shift control is performed by establishing an automatic shift mode that shifts the continuously variable transmission 18 within the shift range set in the control. The "L" position is an engine brake position at which strong engine brake is applied. Thus, the "P" and "N" positions are non-drive positions that are selected when the driver does not drive the vehicle, and the "R", "D" and "L" positions are drive positions that are selected when the driver drives the vehicle.

FIG. 3 is a hydraulic circuit diagram showing the sections of the hydraulic control circuit 100 that are related to the belt clamping force control of the continuously variable transmission 18, the speed ratio control of the continuously variable transmission 18, and the control of hydraulic pressures for engaging the forward-drive clutch C1 and the reverse-drive brake B1 according to the operation of the shift lever 74. Referring to FIG. 3, the hydraulic control circuit 100 includes: a clamping force control valve 110 that adjusts the belt clamping pressure Pd, which is the hydraulic pressure of the output side hydraulic cylinder 46c, such that the transmission belt 48 does not slip, an upshift speed ratio control valve 114 and a downshift speed ratio control valve 116 each of which controls the flow rate of the hydraulic fluid supplied to the input side variable pulley 42 such that the speed ratio γ of the continuously variable transmission 18 continuously changes as required; a thrust force ratio control valve 118 that controls the ratio between a shift control pressure Pin and the belt clamping pressure Pd according to a predetermined relation therebetween; and a manual valve 120 that mechanically switches hydraulic passages according to the operation of the shift lever 74 such that the forward-drive clutch C1 and the reverse-drive brake B1 are engaged and released as needed, respectively.

The line hydraulic pressure $P_L$ is obtained by adjusting the base pressure to a value reflecting the engine load, etc. by controlling a primary regulator valve (line hydraulic pressure adjusting valve) 122 according to a control hydraulic pressure $P_{SLT}$, which is the hydraulic pressure output from the linear solenoid valve SLT. The base pressure is the hydraulic pressure generated by the oil pump 28 that is driven by the engine 12 (Refer to FIG. 1). The primary regulator valve 122 is, for example, a relief type regulator valve.

The primary regulator valve 122 has: a spool valve body 122a that is axially movable and opens and closes an input port 122i so that the hydraulic pressure generated by the oil pump 28 is discharged to an intake hydraulic passage 124 via an output port 122t, a spring 122b that is an urging member for urging the spool valve body 122a in the valve close direction; a hydraulic chamber 122c that accommodates the spring 122b and receives the control hydraulic pressure $P_{SLT}$ to apply a thrust force to the spool valve body 122a in the valve close direction; and a hydraulic chamber 122d that receives the hydraulic pressure generated by the oil pump 28 to apply a thrust force to the spool valve body 122a in the valve open direction.

In the primary regulator valve 122 configured as described above, an equilibrium is reached in the expression (1) indicated below:

$$P_L \times b = P_{SLT} \times a + F_S \quad (1)$$

where "$F_S$" represents the urging force of the spring 122b, "a" represents the area in the hydraulic chamber 122c to which the control hydraulic pressure $P_{SLT}$ is applied, and "b" represents the area in the primary regulator valve 122 to which the line hydraulic pressure $P_L$ is applied. Thus, the line hydraulic pressure $P_L$ is expressed by the expression (2) indicated below and is proportional to the control hydraulic pressure $P_{SLT}$.

$$P_L = P_{SLT} \times (a/b) + F_S/b \quad (2)$$

Thus, the primary regulator valve 122 and the linear solenoid valve SLT function as pressure adjustment devices for adjusting the pressure of the hydraulic fluid discharged from the oil pump 28 to the line hydraulic pressure $P_L$ based on line hydraulic pressure command signals $S_{PL}$, which indicate hydraulic pressure command values.

A modulator hydraulic pressure $P_M$ is the base pressure for the control hydraulic pressure $P_{SLT}$ and the control hydraulic pressure $P_{SLS}$, which is the output hydraulic pressure of the linear solenoid valve SLS. The modulator hydraulic pressure $P_M$ is the base pressure also for a control hydraulic pressure $P_{DS1}$, which is the output hydraulic pressure of a solenoid valve DS1 that operates under the duty control by the electronic control unit 50 and a control hydraulic pressure $P_{DS2}$, which is the output hydraulic pressure of a solenoid valve DS2. The modulator hydraulic pressure $P_M$ is obtained by adjusting the line hydraulic pressure $P_L$, as the base pressure, to a certain constant pressure by a modulator valve 126.

The output hydraulic pressure $P_{LM2}$ is obtained by adjusting the line hydraulic pressure $P_L$, as the base pressure, by a line hydraulic pressure modulator NO. 2 valve 128 according to the control hydraulic pressure $P_{SLT}$.

The output hydraulic pressure $P_{LM2}$ is supplied to an input port 120a of the manual valve 120. When the shift lever 74 is operated to the "D" position or to the "L" position, the hydraulic path in the manual valve 120 is switched such that the output hydraulic pressure $P_{LM2}$ is supplied, as a forward drive output pressure, to the forward-drive clutch C1 via a forward drive output port 120f while the hydraulic fluid in the reverse-drive brake B1 is drained (discharged) into the ambient pressure via a reverse drive output port 120r and a discharge port EX, so that the forward-drive clutch C1 is engaged and the reverse-drive brake B1 is released.

When the shift lever 74 is operated to the "R" position, the hydraulic path in the manual valve 120 is switched such that the output hydraulic pressure $P_{LM2}$ is supplied, as a reverse drive output pressure, to the reverse-drive brake B1 via the reverse drive output port 120r while the hydraulic fluid in the forward-drive clutch C1 is drained (discharged) into the ambient pressure via the forward drive output port 120f and the discharge port EX, so that the reverse-drive brake B1 is engaged and the forward-drive clutch C1 is released.

Further, when the shift lever 74 is operated to the "P" position or the "N" position, the hydraulic path in the manual valve 120 is switched such that the hydraulic passage from the input port 120a to the forward drive output port 120f and the hydraulic passage from the input port 120a to the reverse drive output port 120r are both interrupted and the hydraulic fluids in the forward-drive clutch C1 and the reverse-drive brake B1 are both drained via the manual valve 120, so that the forward-drive clutch C1 and the reverse-drive brake B1 are both released.

The upshift speed ratio control valve 114 has: a spool valve body 114a that is axially movable and is selectively set in an upshift position at which the line hydraulic pressure $P_L$ is supplied to the input side variable pulley 42 via an input port 114i and an input/output port 114j and an input/output port 114k is closed and in an initial position at which the input side variable pulley 42 is in communication with the input/output port 114$k$ via the input/output port 114$j$; a spring 114$b$ that is an urging member for urging the spool valve body 114$a$ toward the initial position of the spool valve body 114$a$; a hydraulic chamber 114$c$ that accommodates the spring 114$b$ and receives the control hydraulic pressure $P_{DS2}$ to apply a thrust force to the spool valve body 114$a$ in the direction toward the initial position of the spool valve body 114$a$; and a hydraulic chamber 114$d$ that receives the control hydraulic pressure $P_{DS1}$ to apply a thrust force to the spool valve body 114$a$ in the direction toward the upshift position of the spool valve body 114$a$.

Likewise, the downshift speed ratio control valve 116 has: a spool valve body 116$a$ that is axially movable and is selectively set in a downshift position at which an input/output port 116$j$ is placed in communication with the discharge port EX and in an initial position at which the input/output port 116$j$ is placed in communication with an input/output port 116$k$; a spring 116$b$ that is an urging member for urging the spool valve body 116$a$ toward the initial position of the spool valve body 116$a$; a hydraulic chamber 116$c$ that accommodates the spring 116$b$ and receives the control hydraulic pressure $P_{DS1}$ to apply a thrust force to the spool valve body 116$a$ in the direction toward the initial position of the spool valve body 116$a$; and a hydraulic chamber 116$d$ that receives the control hydraulic pressure $P_{DS2}$ to apply a thrust force to the spool valve body 116$a$ in the direction toward the downshift position of the spool valve body 116$a$.

In the upshift speed ratio control valve 114 and the downshift speed ratio control valve 116 that are configured as described above, when the upshift speed ratio control valve 114 is closed with the spool valve body 114$a$ being maintained at the initial position under the urging force of the spring 114$b$ as indicated on the left side of the center line extending through the upshift speed ratio control valve 114 and the downshift speed ratio control valve 116 in FIG. 3, the input/output port 114$j$ and the input/output port 114$k$ are in communication with each other and thus the hydraulic fluid in the input side variable pulley 42 (the input side hydraulic cylinder 42$c$) is allowed to flow to the input/output port 116$j$. When the downshift speed ratio control valve 116 is closed with the spool valve body 116$a$ being maintained at the initial position under the urging force of the spring 116$b$ as indicated in the right side of the center line in FIG. 3, the input/output port 116$j$ and the input/output port 116$k$ are in communication with each other and thus a thrust force ratio control hydraulic pressure $P_\tau$ is allowed to be output from the thrust force ratio control valve 118 to the input/output port 114$k$.

When the control hydraulic pressure $P_{DS1}$ is supplied to the hydraulic cylinder 114$d$, due to the thrust force produced by the control hydraulic pressure $P_{DS1}$, the spool valve body 114$a$ moves toward the upshift position against the urging force of the spring 114$b$ as indicated on the right side of the center line in FIG. 3. This causes the line hydraulic pressure $P_L$ to be supplied from the spool valve body 114$a$ to the input side hydraulic cylinder 42$c$ via the input/output port 114$j$ at a flow rate corresponding to the control hydraulic pressure $P_{DS1}$ and closes the input/output port 114$k$, interrupting the flow of hydraulic fluid to the downshift speed ratio control valve 116. As such, the shift control pressure Pin increases and the width of the V-shaped groove of the input side variable pulley 42 decreases accordingly, so that the speed ratio γ decreases, that is, the continuously variable transmission 18 shifts up.

On the other hand, when the control hydraulic pressure $P_{DS2}$ is supplied to the hydraulic chamber 116$d$, due to the thrust force produced by the control hydraulic pressure $P_{DS2}$, the spool valve body 116$a$ moves toward the downshift position against the urging force of the spring 116$b$ as indicated on the left side of the center line in FIG. 3. This causes the hydraulic fluid in the input side hydraulic cylinder 42$c$ to be discharged from the discharge port EX via the input/output port 114$j$, the input/output port 114$k$, and the input/output port 116$j$. As such, the shift control pressure Pin decreases and the width of the V-shaped groove of the input side variable pulley 42 increases accordingly, so that the speed ratio γ increases, that is, the continuously variable transmission 18 shifts down.

Thus, the line hydraulic pressure $P_L$ is used as the base pressure of the shift control pressure Pin. When the control hydraulic pressure $P_{DS1}$ is being output, the line hydraulic pressure $P_L$ input to the upshift speed ratio control valve 114 is supplied to the input side hydraulic cylinder 42$c$ to increase the shift control pressure Pin so that the continuously variable transmission 18 shifts up continuously. When the control hydraulic pressure $P_{DS2}$ is being output, the hydraulic fluid in the input side hydraulic cylinder 42$c$ is discharged from the discharge port EX to reduce the shift control pressure Pin so that the continuously variable transmission 18 shifts down continuously.

Figure 4:
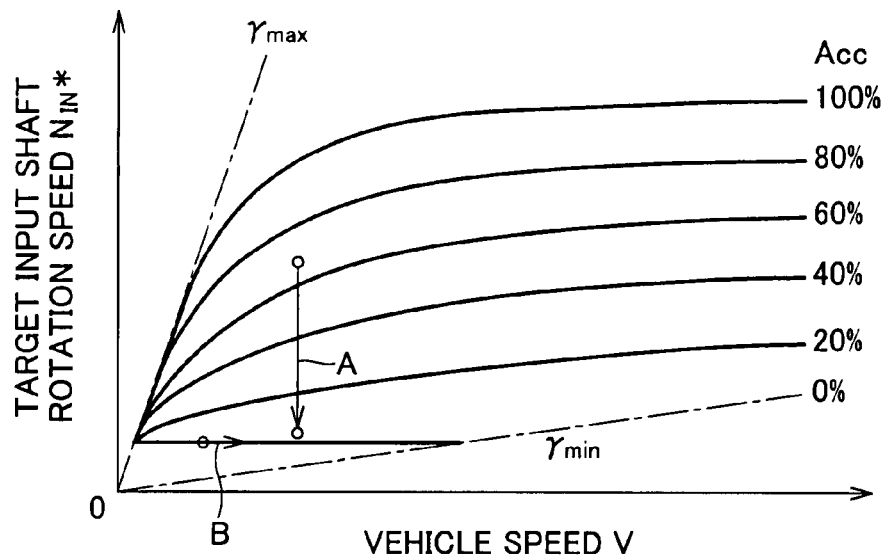
FIG. 4 is one example of a shift map that is used to determine the target input rotation speed in the shift control of the continuously variable transmission.

For example, the shifting of the continuously variable transmission 18 is controlled through feedback control based on the difference between a target input shaft rotation speed $N_{IN}^*$ and the actual input shaft rotation speed $N_{IN}$ ($\Delta N_{IN}$ (=$N_{IN}^*$−$N_{IN}$)) such that the input shaft rotation speed $N_{IN}$ equals the target input shaft rotation speed $N_{IN}^*$. The target input shaft rotation speed $N_{IN}^*$ is set by applying the vehicle speed V and the accelerator operation amount $A_{CC}$, which are the parameters indicating the operation conditions of the vehicle, to a prestored relation between the vehicle speed V and the target input shaft rotation speed $N_{IN}^*$ (i.e., the target input rotation speed of the continuously variable transmission 18). This relation is defined in the form of a shift map, such as the one as shown in FIG. 4, in which the accelerator operation amount $A_{CC}$ is used as a parameter. That is, the feedback control is performed so that the speed ratio γ continuously changes as the width of the V-shaped groove of the input side variable pulley 42 and the width of the V-shaped groove of the output side variable pulley 46 change as the hydraulic fluid are supplied to and discharged from the input side hydraulic cylinder 42$c$.

The shift map in FIG. 4 defines the conditions for shifting the continuously variable transmission 18 and is formulated so as to set the target input shaft rotation speed $N_{IN}^*$ such that the speed ratio γ increases as the vehicle speed decreases and as the accelerator operation amount $A_{CC}$ increases. Also, because the vehicle speed V corresponds to the output shaft rotation speed $N_{OUT}$, the target input shaft rotation speed $N_{IN}^*$, which is the target value of the input shaft rotation speed $N_{IN}$, corresponds to a target speed ratio γ* (=$N_{IN}^*$/$N_{OUT}$) and is set within the range between the minimum speed ratio γmin and the maximum speed ratio γmax of the continuously variable transmission 18.

Meanwhile, the control hydraulic pressure $P_{DS1}$ is supplied to the hydraulic chamber 116$c$ of the downshift speed ratio control valve 116 so that, regardless of the control hydraulic pressure $P_{DS2}$, the downshift speed ratio control valve 116 is closed and thus a downshift of the continuously variable transmission 18 is limited, and the control hydraulic pressure $P_{DS2}$ is supplied to the hydraulic chamber 114$c$ of the upshift speed ratio control valve 114 so that, regardless of the control hydraulic pressure $P_{DS1}$, the upshift speed ratio control valve 114 is closed and thus an upshift of the continuously variable transmission 18 is prohibited. Namely, the upshift speed ratio control valve 114 and the downshift speed ratio control valve 116 are kept closed with the spool valve bodies 114a and 116a being maintained at their initial positions when the control hydraulic pressure $P_{DS1}$ and the control hydraulic pressure $P_{DS2}$ are being supplied at the same time, as well as when none of the control hydraulic pressure $P_{DS1}$ and the control hydraulic pressure $P_{DS2}$ is being supplied. With this arrangement, even in a case where a failure occurs in which one of the solenoid valves DS1, DS2 becomes inoperative due to some trouble in the electric system and thus the control hydraulic pressure $P_{DS1}$ or the control hydraulic pressure $P_{DS2}$ continues to be output at the maximum level, the continuously variable transmission 18 can be prevented from being shifting up or down sharply and therefore slipping of the transmission belt 48, which may otherwise be caused by shape shifting of the continuously variable transmission 18, can be avoided.

Meanwhile, the clamping force control valve 110 has: a spool valve body 110a that is axially movable and opens and closes an input port 110i so that the line hydraulic pressure $P_L$ is supplied from an input port 110i to an output port 110t, whereby the belt clamping pressure Pd is output to the output side variable pulley 46 and to the thrust force ratio control valve 118; a spring 110b that is an urging member for urging the spool valve body 110a in the valve open direction; a hydraulic chamber 110c that accommodates the spring 110b and receives the control hydraulic pressure $P_{SLS}$ to apply a thrust force to the spool valve body 110a in the valve open direction; a feedback hydraulic chamber 110d that receives the belt clamping pressure Pd output from the output port 110t to apply a thrust force to the spool valve body 110a in the valve close direction; and a hydraulic chamber 110e that receives the modulator hydraulic pressure $P_M$ to apply a thrust force to the spool valve body 110a in the valve close direction.

In the clamping force control valve 110 configured as described above, the line hydraulic pressure $P_L$ is continuously adjusted using the control hydraulic pressure $P_{SLS}$ as a pilot pressure such that the transmission belt 48 does not slip, and thus the belt clamping pressure Pd is output from the output port 110t. As such, the line hydraulic pressure $P_L$ is used as the base pressure of the belt clamping pressure Pd.

For example, the belt clamping pressure Pd is adjusted so as to obtain a belt clamping force Pd* that is determined (calculated) by applying the actual speed ratio γ and the accelerator operation amount $A_{CC}$, which are the parameters indicating the operation conditions of the vehicle, to a relation between the speed ratio γ and the belt clamping force Pd*, which has been empirically determined in advance so as to prevent belt slippages. This relation is defined in the form of a shift map, such as the one shown in FIG. 5, in which the accelerator operation amount $A_{CC}$, which corresponds to the transmitted torque, is used as a parameter. Then, the belt clamping force Pd*, that is, the frictional force between the input side variable pulley 42 and the transmission belt 48 and that between the output side variable pulley 46 and the transmission belt 48 are reduced in accordance with the belt clamping pressure Pd adjusted as described above.

Meanwhile, the thrust force ratio control valve 118 has: a spool valve body 118a that is axially movable and opens and closes an input port 118i so that the line hydraulic pressure $P_L$ is supplied from an input port 118i to an output port 118t whereby the thrust force ratio control hydraulic pressure $P_\tau$ is output to the downshift speed ratio control valve 116; a spring 118d that is a urging member for urging the spool valve body 118a in the valve open direction; a hydraulic chamber 118c that accommodates the spring 118b and receives the belt clamping pressure Pd to apply a thrust force to the spool valve body 118a in the valve open direction; a feedback hydraulic chamber 118d that receives the thrust force ratio control hydraulic pressure $P_\tau$ output from the output port 118t to apply a thrust force to the spool valve body 118a in the valve close direction.

In the thrust force ratio control valve 118 configured as described above, an equilibrium is reached in the expression (3) indicated below:

$$P\tau \times b = Pd \times a + F_s \quad (3)$$

where "a" represents the area in the hydraulic chamber 118c to which the belt clamping pressure Pd is applied, "b" represents the area in the feedback hydraulic chamber 118d to which the thrust force ratio control hydraulic pressure $P_\tau$ is applied, and "$F_S$" represents the urging force of the spring 118b. Thus, the thrust force ratio control hydraulic pressure $P_\tau$ is expressed by the expression (4) indicated below and is proportional to the belt clamping pressure Pd.

$$P\tau = Pd \times (a/b) + F_S/b \quad (4)$$

In the state where the upshift speed ratio control valve 114 and the downshift speed ratio control valve 116 are both closed with the spool valve bodies 114a and 116a being kept at their initial positions due to none of the control hydraulic pressures $P_{DS1}$, $P_{DS2}$ being supplied or due to the control hydraulic pressures $P_{DS1}$, $P_{DS2}$ being supplied at the same time, the thrust force ratio control hydraulic pressure $P_\tau$ is supplied to the input side hydraulic cylinder 42c, so that the shift control pressure Pin equals the thrust force ratio control hydraulic pressure $P_\tau$. Namely, the thrust force ratio control hydraulic pressure $P_\tau$, that is, the shift control pressure Pin of a level that keeps the ratio between the shift control pressure Pin and the belt clamping pressure Pd at the value defined in a predetermined relation between the shift control pressure Pin and the belt clamping pressure Pd is output from the thrust force ratio control valve 118.

Meanwhile, the accuracy of the vehicle speed sensor 58 detecting the vehicle speed V is relatively low, for example, when the vehicle is running in an extremely low speed range below a predetermined speed. Therefore, when the vehicle is running in such an extremely low speed range or is starting from a standstill, instead of the foregoing feedback control for eliminating the rotation speed difference (rotation speed deviation) $\Delta N_{IN}$, what is called a valve-closing control is performed in which the control hydraulic pressure $P_{DS1}$ and the control hydraulic pressure $P_{DS2}$ are cut off so that the upshift speed ratio control valve 114 and the downshift speed ratio control valve 116 are both closed. During this valve-closing control, the shift control pressure Pin of a level that is proportional to the belt clamping pressure Pd as defined in the predetermined relation between the shift control pressure Pin and the belt clamping pressure Pd is supplied to the input side hydraulic cylinder 42c, so that slipping of the transmission belt 48 is prevented when the vehicle is starting from a standstill or when the vehicle is running in the extremely low speed range. If "(a/b)" and/or "FS/b" in the first term of the right side of the expression (4) described above are set such that a thrust force ratio τ (=output side hydraulic cylinder thrust force $W_{OUT}$/input side hydraulic cylinder thrust force $W_{IN}$, where "$W_{OUT}$" is the product of the belt clamping force Pd and the cross-sectional area of the output side hydraulic cylinder 46c and "$W_{IN}$" is the product of the shift control pressure Pin and the cross-sectional area of the input side hydraulic cylinder 42c) becomes, during the valve-closing control, larger than the value corresponding to the maximum speed ratio γmax, the vehicle can be driven at the maximum speed ratio γmax or at a speed ratio close to it when the vehicle is starting from a standstill, and therefore, the vehicle can start smoothly. The foregoing predetermined low speed corresponds to the lower limit of the vehicle speed range in which the rotation speed of a specific rotational element, for example, the input shaft rotation speed $N_{IN}$ can be detected and thus the feedback control can be performed, and it is set to, for example, 2 km/h.

Figure 6:
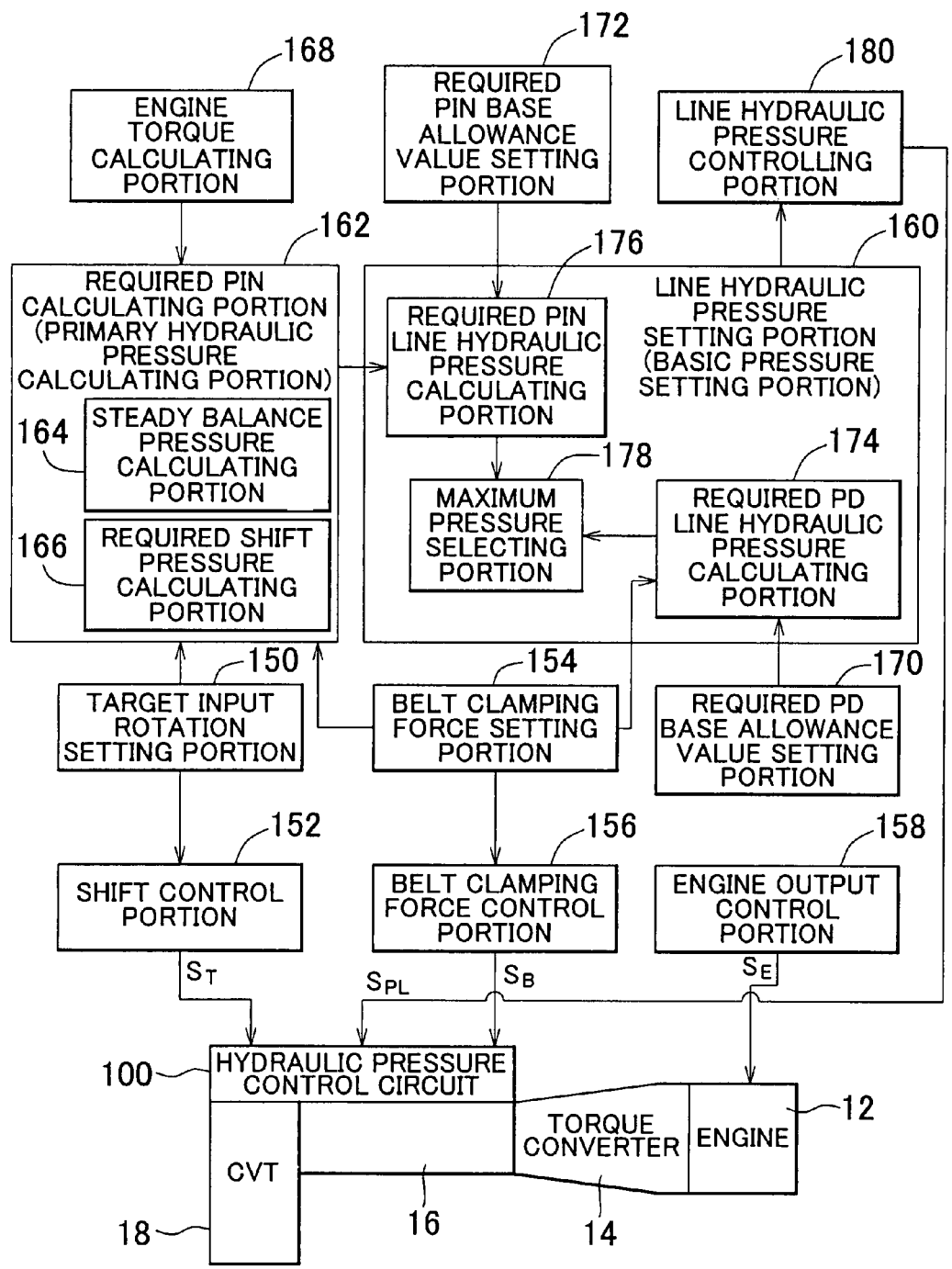
FIG. 6 is a functional block diagram illustrating the main control functions of the electronic control unit shown in FIG. 2.

FIG. 6 is a functional block diagram illustrating the main control functions of the electronic control unit 50. Referring to FIG. 6, a target input rotation setting portion 150 sets the target input shaft rotation speed $N_{IN}*$, which is the target value of the input shaft rotation speed $N_{IN}$, by applying the vehicle speed V and the accelerator operation amount $A_{CC}$, which are the parameters indicating the operation conditions of the vehicle, to a predetermined shift map, such as the one shown in FIG. 4.

A shift control portion 152 controls the shifting of the continuously variable transmission 18 through feedback control based on the rotation speed difference $\Delta N_{IN}$ ($=N_{IN}*-N_{IN}$) such that the input shaft rotation speed $N_{IN}$ equals the target input shaft rotation speed $N_{IN}*$ that has been set by the target input rotation setting portion 150. More specifically, when controlling the shifting of the continuously variable transmission 18, the shift control portion 152 outputs shift control command signals (hydraulic commands) $S_T$ to the hydraulic pressure control circuit 100 so as to control the flow rate of hydraulic fluid to and from the input side hydraulic cylinder 42c such that the width of the V-shaped groove of the input side variable pulley 42 and the width of the V-shaped groove of the output side variable pulley 46 change and thus the speed ratio γ changes continuously as needed.

A belt clamping force setting portion 154 sets the belt clamping force Pd* based on the vehicle operation conditions identified by the actual accelerator operation amount Acc and the actual speed ratio γ ($=N_{IN}/N_{OUT}$) that the electronic control unit 50 calculates from the input shaft rotation speed $N_{IN}$ and the output shaft rotation speed $N_{OUT}$. That is, the belt clamping force setting portion 154 sets the belt clamping pressure Pd of the output side hydraulic cylinder 46c as needed to produce the belt clamping force Pd*.

A belt clamping force control portion 156 increases and reduces the belt clamping force Pd* by outputting, to the hydraulic control circuit 100, clamping force control command signals $S_B$ instructing the belt clamping pressure Pd of the output side hydraulic cylinder 46c to be adjusted to a value needed to produce the belt clamping force Pd* that has been set by the belt clamping force setting portion 154 as described above.

In the hydraulic control circuit 100, the solenoid valves DS1, DS2 are operated to control the amount of hydraulic fluid supplied to and discharged from the input side hydraulic cylinder 42c such that the continuously variable transmission 18 shifts as instructed by the shift control command signals $S_T$ stated above, while the linear solenoid valve SLS is operated so as to adjust the belt clamping pressure Pd such that the belt clamping force Pd* increases and decreases as instructed by the clamping force control command signals $S_B$.

An engine output control portion 158 outputs engine output control command signals $S_E$ for controlling the output of the engine 12. For example, the engine output control command signals $S_E$ include the throttle signals output to the throttle actuator 76, the injection signals output to the fuel injection device 78, and the ignition timing signals output to the ignition device 80. In operation, for example, the engine output control portion 158 controls an engine torque $T_E$ by outputting the throttle signals, which instruct the electronic throttle valve 30 to open or close, to the throttle actuator 76, so that the throttle opening degree $\theta_{TH}$ corresponding to the accelerator operation amount $A_{CC}$ is achieved.

Meanwhile, in order to achieve a good shifting performance of the continuously variable transmission 18, for example, in order to achieve a good shift response of the continuously variable transmission 18, the line hydraulic pressure $P_L$, which is the base pressure for the shift control pressure Pin and the belt clamping pressure Pd as mentioned above, needs to be set such that the target value of the shift control pressure Pin for the feedback control of the speed ratio γ (will be referred as "required shift control pressure Pin") and the target value of the belt clamping pressure Pd for obtaining the belt clamping force Pd* (will be referred to as "required belt clamping pressure Pd") can be achieved in operation.

That is, when the line hydraulic pressure $P_L$ is higher than the required shift control pressure Pin and the required belt clamping pressure Pd, the shift response of the continuously variable transmission 18 becomes quick and thus the possibility of slipping of the transmission belt 48 decreases. However, if the line hydraulic pressure $P_L$ is higher than necessary, the fuel economy may decrease significantly. On the other hand, when the line hydraulic pressure $P_L$ is lower than the required shift control pressure Pin and the required belt clamping pressure Pd, it may slow the shift response of the continuously variable transmission 18. Also, when the line hydraulic pressure $P_L$ is lower then the required belt clamping pressure Pd, it increases the possibility of slipping of the transmission belt 48.

To cope with this, a line hydraulic pressure setting portion 160 that serves as a base pressure setting portion sets, based on the higher of the required shift control pressure Pin and the required belt clamping pressure Pd, the line hydraulic pressure $P_L$ that is controlled via the linear solenoid valve SLT independent of the control of the flow rate of hydraulic fluid to and from the input side hydraulic cylinder 42c via the linear solenoid valve SLS and the control of the required belt clamping pressure Pd via the linear solenoid valve SLS.

For example, the line hydraulic pressure setting portion 160 sets the line hydraulic pressure $P_L$ based on the larger of the sum of the required shift control pressure Pin and an allowance value that is set in consideration of the control accuracy of the line hydraulic pressure $P_L$ and the vehicle operation conditions and the sum of the required belt clamping pressure Pd and an allowance value that is set in consideration of the control accuracy of the line hydraulic pressure $P_L$ and the vehicle operation conditions.

Figure 7:
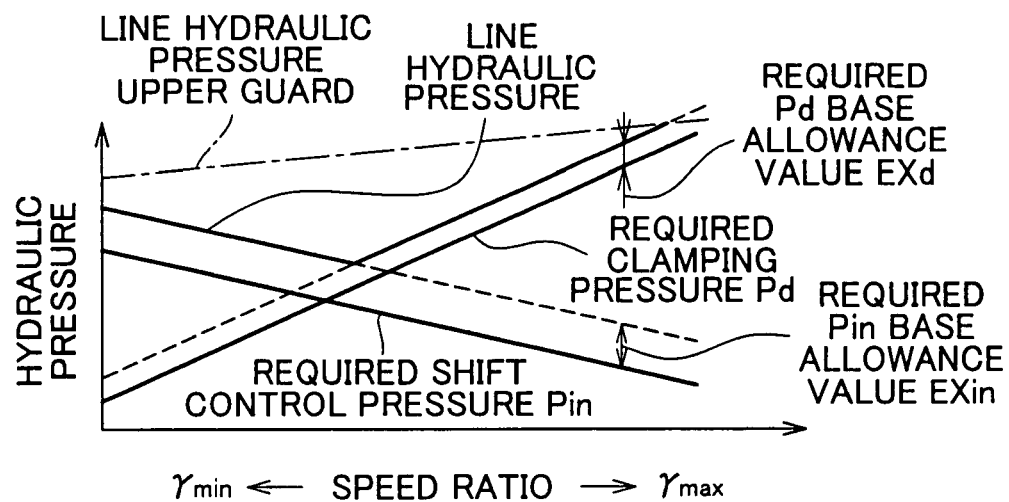
FIG. 7 is a chart illustrating one example of the principal for setting the line hydraulic pressure.

FIG. 7 is a chart illustrating one example of the principal for setting the line hydraulic pressure $P_L$. Referring to FIG. 7, in this exemplary embodiment, base allowance values EX that have been empirically determined in advance are used. The base allowance value EX for the required shift control pressure Pin is denoted a required Pin base allowance value EXin and the base allowance value EX for the required belt clamping pressure Pd is denoted a required Pd base allowance value EXd. Namely, the base allowance values EX are set to different values for the required shift control pressure Pin and the required belt clamping pressure Pd. Thus, the line hydraulic pressure $P_L$ is set to the larger of the sum of the required shift control pressure Pin and the required Pin base allowance value EXin and the sum of the required belt clamping pressure Pd and the required Pd base allowance value EXd, and the line hydraulic pressure control command signals $S_{PL}$ for obtaining the line hydraulic pressure $P_L$ are output.

More specifically, the required belt clamping pressure Pd is the hydraulic pressure that is directly adjusted through the operation of the linear solenoid valve SLS based on the clamping force control command signals $S_B$ that are output from the belt clamping force control portion 156 such that the belt clamping force Pd* is obtained. Therefore, the required belt clamping pressure Pd for obtaining the belt clamping force Pd* set by the belt clamping force setting portion 154 is used as it is when setting the line hydraulic pressure $P_L$.

On the other hand, the required shift control pressure Pin is the hydraulic pressure that is built up as a result of the control of the flow rate of hydraulic fluid and the control of the belt clamping force that are executed during the feedback control for achieving the target input shaft rotation speed $N_{IN}^*$ (or target speed ratio $\gamma^*$). That is, the required shift control pressure Pin is not directly adjusted. Therefore, the value of the required shift control pressure Pin for the setting of the line hydraulic pressure $P_L$ needs to be estimated.

The required shift control pressure Pin includes a steady balance pressure Pc, which is the hydraulic pressure for maintaining the speed ratio $\gamma$ constant, and a required shift pressure Pv, which is the hydraulic pressure for changing the speed ratio $\gamma$. More specifically, when the continuously variable transmission 18 is shifted down by increasing the width of the V-shaped groove of the input side variable pulley 42 by discharging the hydraulic fluid from the input side variable pulley 42, the shift control pressure Pin is set equal to the steady balance pressure Pc, which is the hydraulic pressure needed to maintain the speed ratio $\gamma$ constant. On the other hand, when the continuously variable transmission 18 is shifted up, the required shift control pressure Pin is set to the sum of the steady balance pressure Pc and the required shift pressure Pv that is required to produce an input side hydraulic cylinder thrust force $W_{IN}$ that is needed to reduce the width of the V-shaped groove of the input side variable pulley 42 such that the speed ratio $\gamma$ decreases (changes to the $\gamma$min side).

The required shift pressure Pv is calculated, for example, as a function of the rate of change in the speed ratio (will be referred to as "speed ratio changing rate"). In the case where the required shift pressure Pv is determined as a function of the rate of change in the target speed ratio $\gamma^*$, that is, the target speed ratio changing rate, d ($\gamma^*$)/dt, when the target speed ratio $\gamma^*$ becomes constant while the actual speed ratio $\gamma$ is lagging behind the target speed ratio $\gamma^*$, the required shift pressure Pv may be zeroed despite the fact that the upshift of the continuously variable transmission 18 is sill ongoing, which further delays the completion of the upshift. On the other hand, in the case where the required shift pressure Pv is determined as a function of the rate of change in the actual speed ratio $\gamma$, that is, the actual speed ratio changing rate, d ($\gamma$)/dt, when the actual speed ratio $\gamma$ is lagging behind the target speed ratio $\gamma^*$, the required shift pressure Pv may become smaller than when it is determined as a function of the target speed ratio changing rate, d ($\gamma^*$)/dt, and thus the shift response of the continuously variable transmission 18 be slowed.

In view of the above, the required Pin calculating portion 162, which serves as a primary hydraulic pressure calculating portion, calculates the required shift control pressure Pin for upshifting the continuously variable transmission 18 based on one of the target speed ratio $\gamma^*$ and the speed ratio $\gamma$ with which the required shift pressure Pv is calculated to be larger than with the other.

Figure 8:
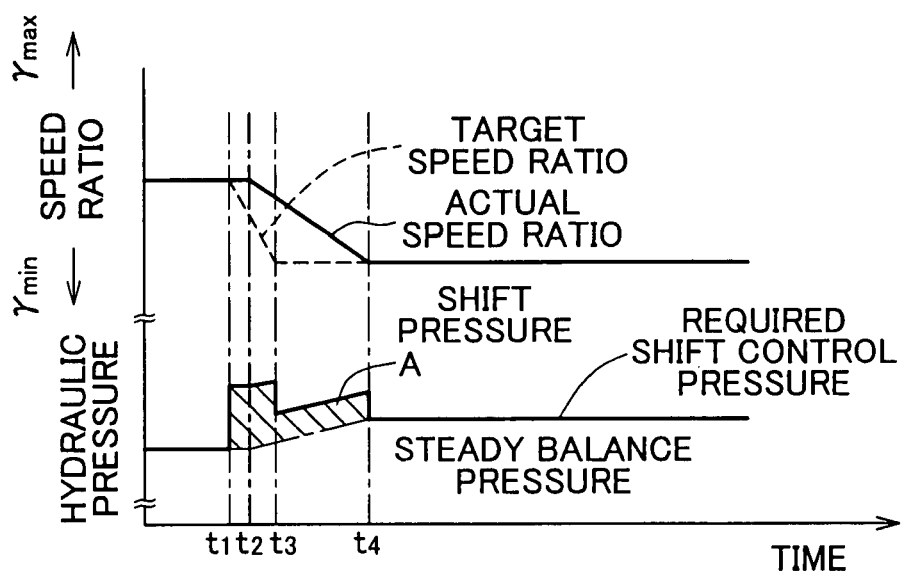
FIG. 8 is a chart illustrating one example of the principal for calculating the required shift control pressure Pin for upshifting the continuously variable transmission.

FIG. 8 is a chart illustrating one example of the principal for calculating the required shift control pressure Pin for upshifting the continuously variable transmission 18. Referring to FIG. 8, when the continuously variable transmission 18 is to be shifted up, the required shift control pressure Pin is calculated by adding the required shift pressure Pv, which is indicated by the shaded area A in FIG. 8, to the steady balance pressure Pc. The required shift pressure Pv is calculated based on the speed ratio changing rate such that it increases as the speed ratio changing rate increases. From $t_1$ to $t_3$ in FIG. 8, the required shift pressure Pv is calculated based on the target speed ratio changing rate d ($\gamma^*$)/dt, which is the larger speed ratio changing rate during this period. From $t_3$ to $t_4$, the required shift pressure Pv is calculated based on the actual speed ratio changing rate d ($\gamma$)/dt, which is the larger speed ratio changing rate during this period. By calculating the required shift pressure Pv in this manner, if the shifting operation is still ongoing while the target speed ratio $\gamma^*$ has become constant as in the time period from $t_3$ to $t_4$, the required shift pressure Pv is appropriately set such that the actual speed ratio $\gamma$ follows the target speed ratio $\gamma^*$. On the other hand, if the change in the actual speed ratio $\gamma^*$ is lagging as in the time period from $t_1$ to $t_3$, the required shift pressure Pv can be appropriately calculated such that the actual speed ratio $\gamma$ follows the target speed ratio $\gamma^*$.

The required Pin calculating portion 162 includes: a steady balance pressure calculating portion 164 that calculates the steady balance pressure Pc; a required shift pressure calculating portion 166 that, when upshifting the continuously variable transmission 18, calculates, based on the input shaft rotation speed $N_{IN}$ set by the target input rotation setting portion 150, a required shift pressure PvM for the target speed ratio $\gamma^*$ (=$N_{IN}/N_{OUT}$) calculated by the electronic control unit 50 and a required shift pressure PvJ for the actual speed ratio $\gamma$. Thus, the required Pin calculating portion 162 uses the steady balance pressure Pc, which has been calculated by the steady balance pressure calculating portion 164, as the required shift control pressure Pin when downshifting the continuously variable transmission 18. On the other hand, when upshifting the continuously variable transmission 18, the required Pin calculating portion 162 selects the higher of the required shift pressure PvM and the required shift pressure PvJ, which have been calculated by the required shift pressure calculating portion 166 as described above, as a maximum required shift pressure Pvmax and obtains the sum of the maximum required shift pressure Pvmax and the steady balance pressure Pc calculated by the steady balance pressure calculating portion 164 and uses the obtained hydraulic pressure value as the required shift control pressure Pin (=Pc+Pvmax).

Meanwhile, the steady balance pressure calculating portion 164 calculates the steady balance pressure Pc by applying an estimated engine torque value $T_{E0}$, which corresponds to the actual speed ratio $\gamma$ and an input torque $T_{IN}$, and the required belt clamping pressure Pd, which has been calculated by the belt clamping force setting portion 154, to a relation (arithmetic expression, Pc=($\gamma$, $T_{IN}$, Required Pd) that has been empirically formulated is used to estimate the steady balance pressure Pc by using the speed ratio $\gamma$, the input torque $T_{IN}$, and the required belt clamping pressure Pd as variables.

The required shift pressure calculating portion 166 calculates the required shift pressure PvM by applying the target speed ratio changing rate d ($\gamma^*$)/dt, which the electronic control unit 50 has calculated from the target speed ratio $\gamma^*$, to a relation (arithmetic expression, Pv=(d($\gamma$)/dt)) that has been empirically formulated in advance and is used to estimate the required shift pressure Pv using the speed ratio changing rate d ($\gamma$)/dt as a variable and calculates the required shift pressure PvJ by applying the actual speed ratio changing rate d ($\gamma$)/dt, which the electronic control unit 50 has calculated from the actual speed ratio $\gamma$, to the same relation.

Figure 9:
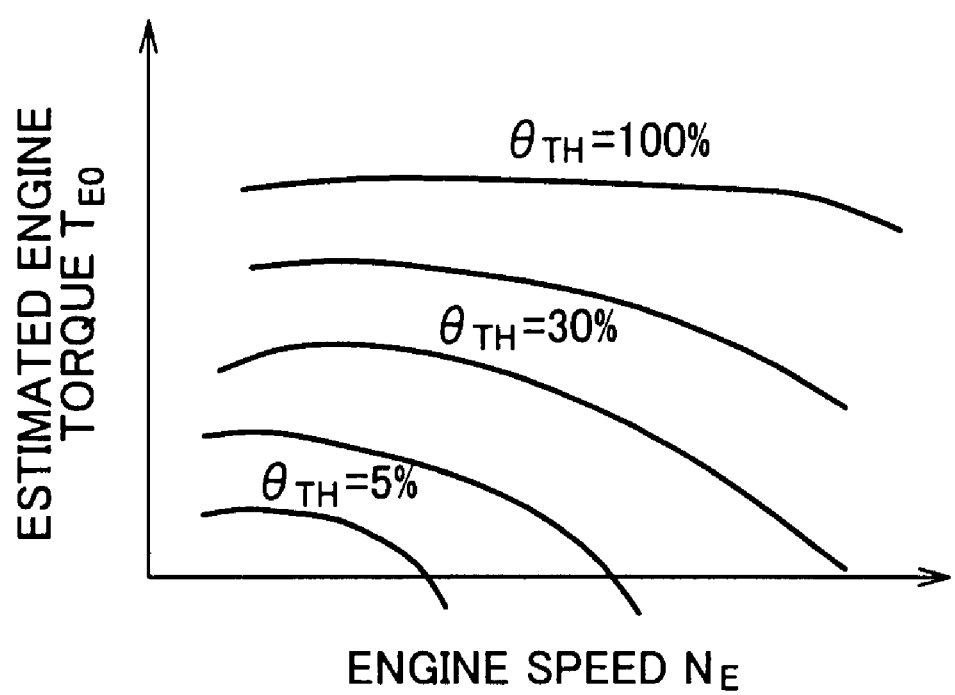
FIG. 9 is a chart illustrating one example of the relation between the engine speed and the estimated engine torque (engine torque map), which has been empirically determined in advance and recorded in memory and in which the opening degree of the throttle valve is used as a parameter.

An engine torque calculating portion 168 estimates the engine torque value $T_{E0}$ by applying the actual engine speed $N_E$ and the throttle opening degree $\theta_{TH}$ to a relation between the engine speed $N_E$ and the estimated engine torque value $T_{E0}$, which has been empirically formulated in advance. This relation is defined in the form of an engine torque map, such as the one shown in FIG. 9, in which the throttle opening degree $\theta_{TH}$ is used as a parameter.

Hereinafter, the base allowance value EX will be described in detail.

The required belt clamping pressure Pd is a hydraulic pressure that is directly adjusted to a level at which the belt clamping force Pd* is obtained. Therefore, a required Pd base allowance value setting portion 170 sets the required Pd base allowance value EXd, which is the value empirically determined in advance and recorded in memory, only in consideration of the deviation between line hydraulic pressure control command $S_{PL}$ and the line hydraulic pressure $P_L$, such that even if the line hydraulic pressure $P_L$ is deviating from the line hydraulic pressure control command signals $S_{PL}$, the actual line hydraulic pressure $P_L$ becomes higher than the required belt clamping pressure Pd.

On the other hand, the required shift control pressure Pin is not directly adjusted but is calculated as an estimated value by the required Pin calculating portion 162. Also, a certain amount of allowance is needed in order to perform the feedback control such that the speed ratio γ remains constant. As such, a required Pin base allowance value setting portion 172 sets a necessary Pin pressure base allowance value EXin such that it becomes larger than the required Pd base allowance value EXd that has been set in consideration of the deviation between the line hydraulic pressure control command signals $S_{PL}$ and the line hydraulic pressure $P_L$ only. In this way, the base allowance value EX is differently set for the required shift control pressure Pin and the belt clamping pressure Pd.

Also, the required Pd base allowance value setting portion 170 and the required Pin base allowance value setting portion 172 change the required Pd base allowance value EXd and the required Pin base allowance value EXin based on the operation conditions (running conditions) of the vehicle.

For example, when the temperature of hydraulic fluid is low, the accuracy in controlling the line hydraulic pressure $P_L$ with respect to the line hydraulic pressure control command signals $S_{PL}$ deteriorates and thus the deviation of the line hydraulic pressure $P_L$ from the line hydraulic pressure control command signals $S_{PL}$ becomes large as compared to when the temperature of hydraulic fluid is normal. Therefore, when the temperature of hydraulic fluid is low, the required Pd base allowance value setting portion 170 and the required Pin base allowance value setting portion 172 make the required Pd base allowance value EXd and the required Pin base allowance value EXin larger than when the temperature of hydraulic fluid is normal. More specifically, the required Pd base allowance value setting portion 170 and the required Pin base allowance value setting portion 172 increase the required Pd base allowance value EXd and the required Pin base allowance value EXin, respectively, as the temperature of hydraulic fluid decreases. Alternatively, when the hydraulic fluid is at a predetermined low temperature, the required Pd base allowance value EXd and the required Pin base allowance value EXin are set such that they become larger by predetermined amounts that have been empirically determined in advance and recorded in memory than when the temperature of hydraulic fluid is normal. The normal temperature is, for example, a temperature reached after the end of the warming-up of the engine.

When the vehicle is running in a steady state, such as when the vehicle speed is running at a constant speed ratio γ, the amount of change in the speed ratio γ is very small as compared to when the speed ratio γ is being changed to shift the continuously variable transmission 18, and therefore it would be enough to have a small allowance for changing the speed ratio γ appropriately. In such a case, therefore, the required Pd base allowance value setting portion 170 and the required Pin base allowance value setting portion 172 make the required Pd base allowance value EXd and the required Pin base allowance value EXin relatively small as compared to when the shifting of the continuously variable transmission 18 is being carried out. For example, when the vehicle is running in a steady state, the required Pd base allowance value EXd and the required Pin base allowance value EXin are set such that they become smaller by predetermined amounts that have been empirically determined in advance and recorded in memory than when the normal shifting of the continuously variable transmission 18 is being carried out. This normal shifting of the continuously variable transmission 18 is the shifting of the continuously variable transmission 18 in which the speed ratio γ changes in a range in which the rate of change in the speed ratio γ does not exceed a predetermined rate.

On the other hand, when the vehicle is running in a state where quick shifting of the continuously variable transmission 18 is required, the speed ratio γ may be quickly changed at a rate higher than the predetermined rate, and therefore a large allowance is needed for increasing the speed ratio γ appropriately. In such a state, therefore, the required Pd base allowance value setting portion 170 and the required Pin base allowance value setting portion 172 make the required Pd base allowance value EXd and the required Pin base allowance value EXin large as compared to when the normal shifting of the continuously variable transmission 18 is being carried out or to when the vehicle is running in a steady state. For example, when the continuously variable transmission 18 is shifting quickly, the required Pd base allowance value EXd and the required Pin base allowance value EXin are made larger by predetermined amounts that have been empirically determined in advance and recorded in memory than when the normal shifting of the continuously variable transmission 18 is being carried out. The state where quick shifting of the continuously variable transmission 18 is required is, for example, when an "off-up shift" in which the accelerator pedal 68 is quickly and thus the vehicle is shapely accelerated as indicated by the line A in FIG. 4 is being carried out or when the speed ratio γ is changed along the lower limit level of the input shaft rotation speed $N_{IN}$ and thus the vehicle is shapely accelerated as indicated by the line B in FIG. 4.

As such, the required Pd base allowance value EXd and the required Pin base allowance value EXin are appropriately set by the required Pd base allowance value setting portion 170 and the required Pin base allowance value setting portion 172, respectively.

The line hydraulic pressure setting portion 160 has: a required Pd line hydraulic pressure calculating portion 174 that calculates a required Pd line hydraulic pressure $P_L$d based on the line hydraulic pressure $P_L$ and a required Pin line hydraulic pressure calculating portion 176 that calculates a required Pin hydraulic line hydraulic pressure $P_L$in based on the required shift control pressure Pin, and a maximum pressure selecting portion 178 that selects one of the required Pd line hydraulic pressure $P_L$d and the required Pin hydraulic line hydraulic pressure $P_L$in that is higher than the other. The line hydraulic pressure setting portion 160 sets the selected one of the required Pd line hydraulic pressure $P_L$d and the required Pin hydraulic line hydraulic pressure $P_L$in as the target value of the line hydraulic pressure $P_L$.

For example, the required Pd line hydraulic pressure calculating portion 174 calculates the required Pd line hydraulic pressure $P_L$d by adding the required Pd base allowance value EXd, which has been set by the required Pd base allowance value setting portion 170 as described above, to the belt clamping force Pd* that has been set by the belt clamping force setting portion 154, that is, the required belt clamping pressure Pd that is needed to produce the belt clamping force Pd*.

Likewise, the required Pin line hydraulic pressure calculating portion 176 calculates the required Pin line hydraulic pressure $P_L$in by adding the required Pin base allowance value EXin, which has been set by the required Pin base allowance value setting portion 172 as described above, to the required shift control pressure Pin that has been calculated by the required Pin calculating portion 162.

Then, the line hydraulic pressure setting portion 160 sets the target value of the line hydraulic pressure $P_L$ to the higher of the required Pd line hydraulic pressure $P_L$d and the required Pin line hydraulic pressure $P_L$in. In this way, the line hydraulic pressure $P_L$ is appropriately set to the minimum necessary level for obtaining the required shift control pressure Pin for shifting the continuously variable transmission 18 and the required belt clamping pressure for producing the belt clamping force, so that desired shifting performance and belt clamping force are obtained.

However, the line hydraulic pressure setting portion 160 sets the line hydraulic pressure $P_L$ under a predetermined upper limit value such that the line hydraulic pressure $P_L$ does not reaching an excessive level, such as a level higher than the allowable load of the transmission belt 48, even if the speed ratio γ is changed in steps and thus the required shift control pressure Pin calculated by the required Pin calculating portion 162 becomes excessive, that is, even if the speed ratio γ changes in steps and thus the required shift pressure PvM calculated by the required shift pressure calculating portion 166 becomes excessive. This upper limit value is a line hydraulic pressure upper guard, such as the one shown in the chart of FIG. 7, which has been empirically determined in advance so as to prevent the line hydraulic pressure $P_L$ from exceeding the allowable load of the transmission belt 48. This line hydraulic pressure upper guard may be determined based on the fuel economy as well as on the allowable load of the transmission belt 48.

A line hydraulic pressure controlling portion 180 adjusts the line hydraulic pressure $P_L$ by outputting to the hydraulic control circuit 100 the line hydraulic pressure control command signals $S_{PL}$ for achieving the target value of the line hydraulic pressure $P_L$ that the line hydraulic pressure setting portion 160 has set as described above.

Then, in response to the line hydraulic pressure control command signals $S_{PL}$, the hydraulic control circuit 100 operates the linear solenoid valve SLT such that the line hydraulic pressure $P_L$ is adjusted as instructed by the line hydraulic pressure control command signals $S_{PL}$.

Figure 10:
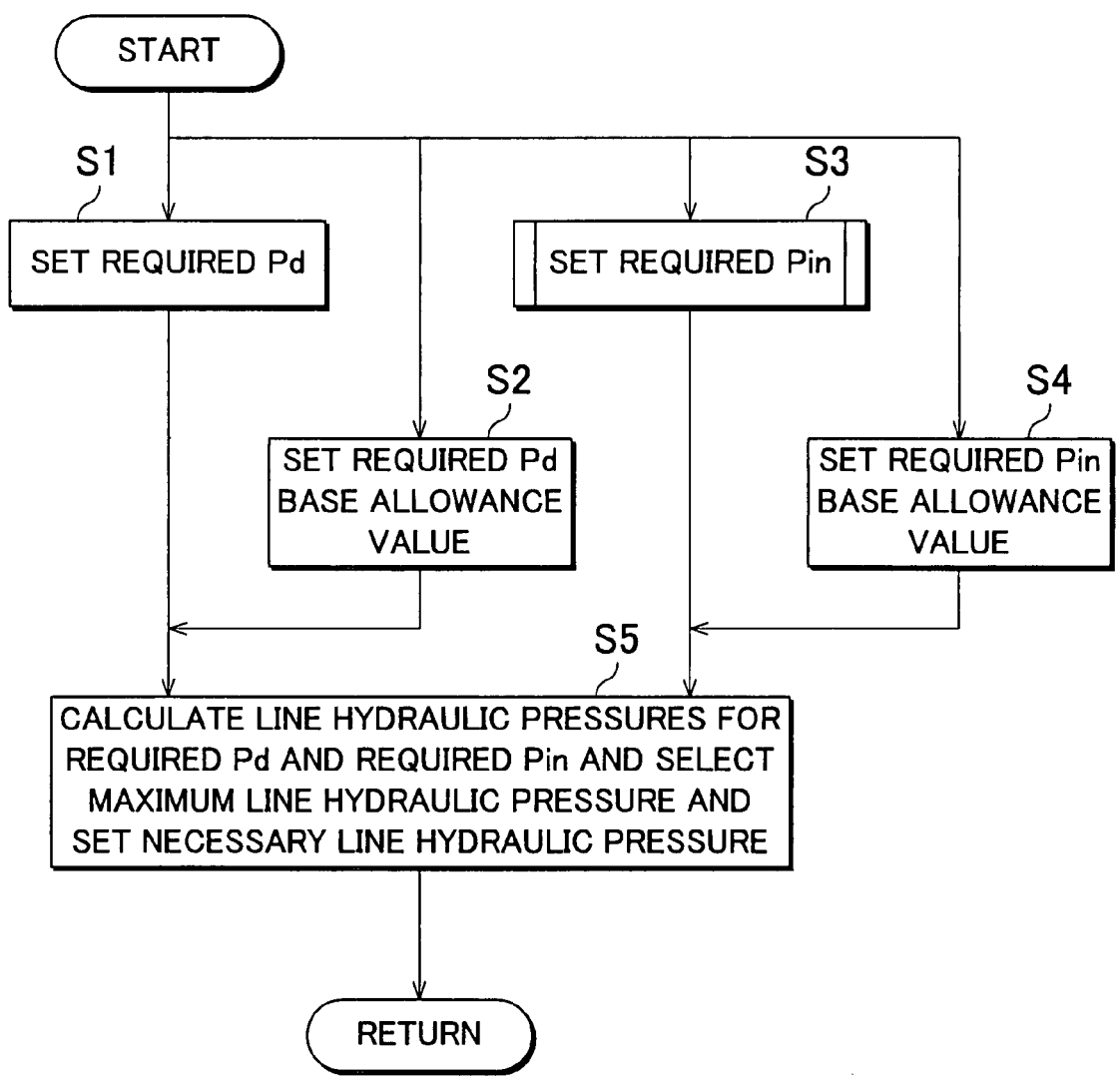
FIG. 10 is a flowchart illustrating the main control procedure executed by the electronic control unit shown in FIG. 2, that is, the control procedure that the electronic control unit executes to appropriately set the line hydraulic pressure in accordance with the required shift control pressure Pin and the required belt clamping pressure Pd.
Figure 11:
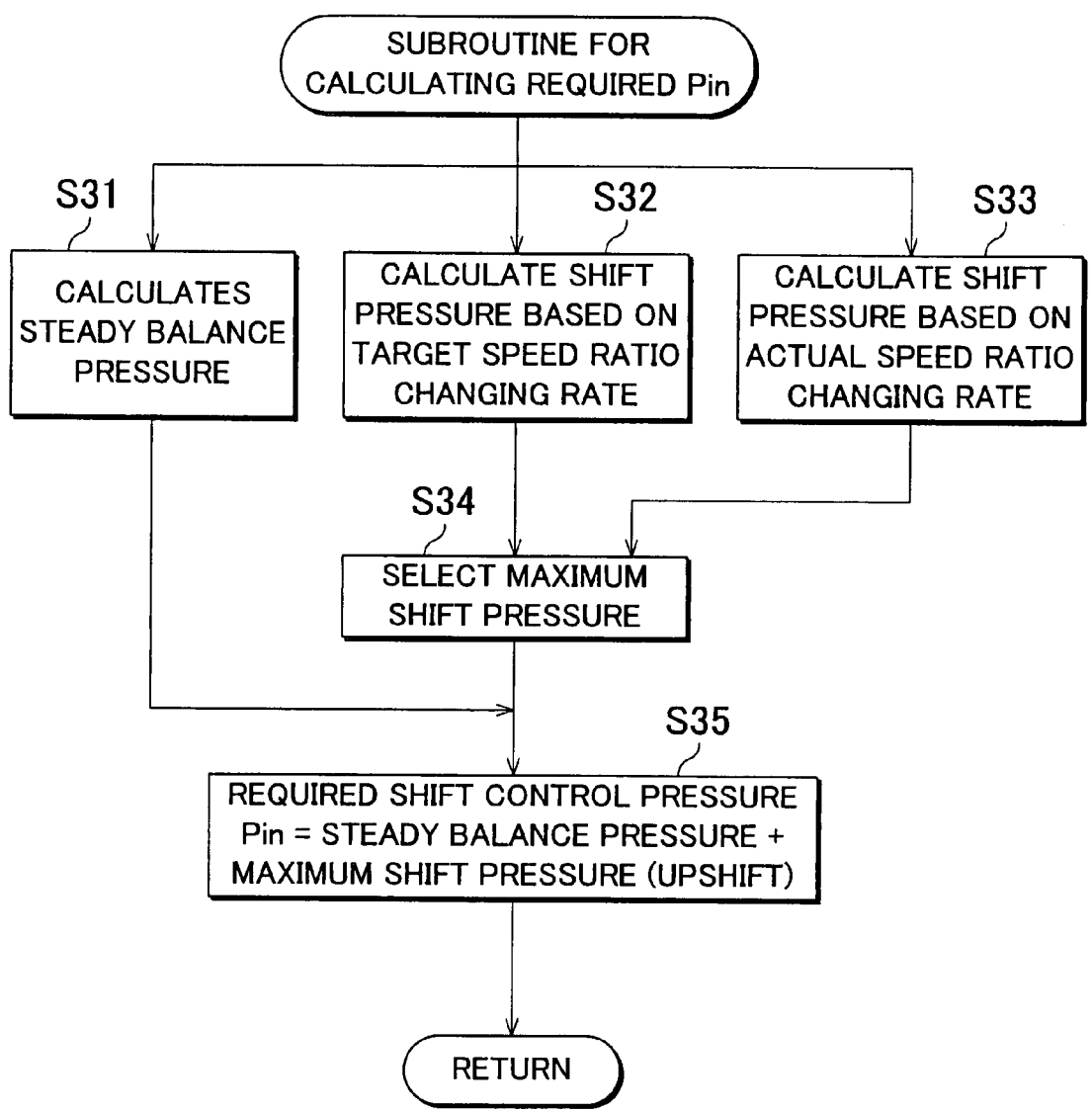
FIG. 11 is a flowchart illustrating a subroutine of the control routine shown in FIG. 10, which is executed to calculate the required shift control pressure Pin.

FIG. 10 is a flowchart illustrating the main control procedure executed by the electronic control unit 50, that is, the control procedure that the electronic control unit 50 executes to appropriately set the line hydraulic pressure $P_L$ in accordance with the required shift control pressure Pin and the required belt clamping pressure Pd. This control routine is repeated at extremely short time intervals, such as several milliseconds to several tens of milliseconds. FIG. 11 is a flowchart illustrating a subroutine of the control routine shown in FIG. 10, which is executed to calculate the required shift control pressure Pin.

Figure 5:
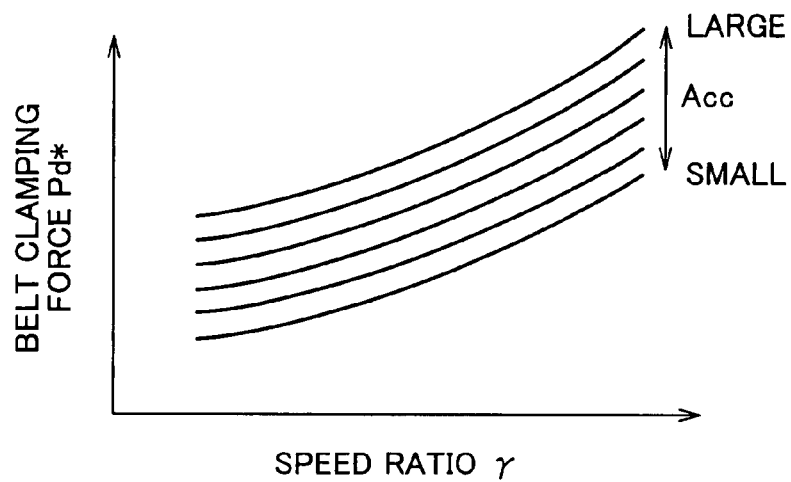
FIG. 5 is one example of a belt clamping force map that is used to determine the belt clamping force in accordance with the speed ratio, and so on, in the belt clamping force control of the continuously variable transmission.

When the routine starts, in step 1 that corresponds to the belt clamping force setting portion 154, the belt clamping force Pd*, that is, the required belt clamping pressure Pd that is needed to obtain the belt clamping force Pd* is set by applying the actual speed ratio γ and the accelerator operation amount Acc to a belt clamping force setting map, such as the one shown in FIG. 5. Note that "step" will hereinafter be abbreviated to "S".

Meanwhile, in S2 that corresponds to the required Pd base allowance value setting portion 170, the required Pd base allowance value EXd, which has been empirically determined in advance and recorded in memory, is set. Note that the required Pd base allowance value EXd is changed in accordance with the operation conditions (running conditions) of the vehicle.

Meanwhile, in S3 that corresponds to S31 to S35 of the routine shown in FIG. 11, the required shift control pressure Pin is calculated as follows. In the control routine shown in FIG. 11, in S31 that corresponds to the steady balance pressure calculating portion 164, the steady balance pressure Pc is calculated by applying the estimated engine torque value $T_{E0}$, which has been estimated in accordance with the actual speed ratio γ and the input torque $T_{IN}$, and the required belt clamping pressure Pd, which has been set in S1 as described above, to a relation (Pc=f(γ, $T_{IN}$, Required Pd) that has been empirically determined in advance and recorded in memory. In S32 that corresponds to the required shift pressure calculating portion 166, if the continuously variable transmission 18 is to be shifted up, the required shift pressure PvM is calculated by applying the target speed ratio changing rate d (γ*)/dt to a relation (Pv=f(d(γ)/dt)) that has been empirically determined in advance and recorded in memory. Also, in S33 that corresponds to the required shift pressure calculating portion 166, if the continuously variable transmission 18 is to be shifted up, the required shift pressure PvJ is calculated by applying the actual speed ratio changing rate d (γ)/dt to a relation (Pv=f(d(γ)/dt)) that has empirically determined in advance and recorded in memory. After S32 and S33, in step 34 that corresponds to the required Pin calculating portion 162, if the continuously variable transmission 18 is to be shifted up, the higher of the required shift pressure PvM that has been calculated in S32 and the required shift pressure PvJ that has been calculated in S33 is selected as a maximum required shift pressure Pvmax. Further, after S31 and S34, in S35 that corresponds to the required Pin calculating portion 162, if the continuously variable transmission 18 is to be shifted down, the steady balance pressure Pc that has been calculated in S31 is used as the required shift control pressure Pin as it is. On the other hand, if the continuously variable transmission 18 is to be shifted up, in S35, the required shift control pressure Pin is calculated by adding the maximum required shift pressure Pvmax, which has been determined in S34 as described above, to the steady balance pressure Pc that has been calculated in S31 (=PC+Pvmax).

Back to FIG. 10, in S4 that corresponds to the required Pin base allowance value setting portion 172, the required Pin base allowance value EXin, which has been empirically determined in advance so as to be larger than the required Pd base allowance value EXd and has been recorded in memory, is set. Note that the required Pin base allowance value EXin is changed in accordance with the operation conditions (running conditions) of the vehicle as in the case of the required Pd base allowance value EXd.

After S1 to S4, in S5 that corresponds to the line hydraulic pressure setting portion 160 (required Pd line hydraulic pressure calculating portion 174, required Pin line hydraulic pressure calculating portion 176, maximum pressure selecting portion 178), the required Pd line hydraulic pressure $P_L$d is calculated by adding the required Pd base allowance value EXd calculated in S4 to the required shift control pressure Pin calculated in S3, and the required Pin line hydraulic pressure $P_L$in is calculated by adding the required Pin base allowance value EXin set in S4 to the required shift control pressure Pin calculated in S3, and the higher of the required Pd line hydraulic pressure $P_L d$ and the required Pin line hydraulic pressure $P_L$in is selected as the target value of the line hydraulic pressure $P_L$.

In this exemplary embodiment of the invention, as describe above, when the line hydraulic pressure setting portion 160 sets the line hydraulic pressure $P_L$, which is the base pressure for the required shift control pressure Pin and the required belt clamping pressure Pd, based on the higher of the required shift control pressure Pin and the required belt clamping pressure Pd, the required Pin calculating portion 162 calculates the required shift control pressure Pin based on one of the target speed ratio $\gamma^*$ and the actual speed ratio $\gamma$ with which the required shift control pressure Pin is calculated to be higher than with the other. Thus, the required shift control pressure Pin is set to the minimum necessary level for shifting up the continuously variable transmission 18 and the line hydraulic pressure $P_L$ is appropriately set so as to produce the required shift control pressure Pin thus set.

Further, according to the exemplary embodiment described above, because the line hydraulic pressure $P_L$ is set using the line hydraulic pressure upper guard as its upper limit, even if the target speed ratio $\gamma^*$ is changed in steps and thus the required shift control pressure Pin calculated by the required Pin calculating portion 162 becomes too high, the line hydraulic pressure $P_L$ does not exceed the allowable load of the transmission belt 48.

Further, according to the exemplary embodiment described above, the required shift control pressure Pin is comprised of the steady balance pressure Pc for maintaining the speed ratio $\gamma$ constant and the required shift pressure Pv for changing the speed ratio $\gamma$, and the required shift control pressure Pin is calculated using, as the required shift pressure Pv, the maximum required shift pressure Pvmax that the required Pin calculating portion 162 has calculated by applying one of the target speed ratio changing rate $d(\gamma^*)/dt$ and the actual speed ratio changing rate $d(\gamma)/dt$ with which the maximum required shift pressure Pvmax is calculated to be higher than with the other to the arithmetic expression for calculating the required shift pressure Pv, which has been recorded in memory in advance. Thus, the required shift control pressure Pin can be appropriately calculated.

While the invention has been described with reference to the exemplary embodiment and the accompanying drawings, the invention is intended to cover other embodiments and examples. For example, in the exemplary embodiment described above, the required Pin calculating portion 162 calculates the required shift control pressure Pin based on the higher of the required shift pressure PvM and the required shift pressure PvJ when shifting up the continuously variable transmission 18, whereby the required shift control pressure Pin is calculated based on one of the target speed ratio changing rate $d(\gamma^*)/dt$ and the actual speed ratio changing rate $d(\gamma^*)/dt$ with which the required shift control pressure Pin is calculated to be higher than with the other. Alternatively, when the continuously variable transmission 18 is to be shifted up, the required shift control pressure Pin may be calculated using the maximum required shift pressure Pvmax that has been calculated by applying the higher of the target speed ratio changing rate $d(\gamma^*)/dt$ and the actual speed ratio changing rate $d(\gamma)/dt$ to an arithmetic expression for calculating the required shift pressure Pv, which has been recorded in memory in advance.

Further, the input shaft rotation speed $N_{IN}$ and other values related thereto, such as the target input shaft rotation speed $N_{IN}^*$, which are used in the exemplary embodiment described above, may be replaced by other parameters, such as the engine speed $N_E$ and the values related thereto, such as the target engine speed $N_E^*$, or by the turbine speed $N_T$ and the values related thereto, such as the target turbine speed $N_T^*$.

Further, while the torque converter 14 having the lock-up clutch 26 is used as the fluid transmission device in the exemplary embodiment described above, the lock-up clutch 26 is not always needed, and a fluid coupling that does not amplify the torque transmitted therethrough may be used in place of the torque converter 14.

While the invention has been described with reference to embodiments thereof, it is to be understood that the invention is not limited to the embodiments or constructions. To the contrary, the invention is intended to cover various modifications and equivalent arrangements. In addition, while the various elements of the embodiments are shown in various combinations and configurations, which are exemplary, other combinations and configurations, including more, less or only a single element, are also within the scope of the invention.

What is claimed is:

1. A control apparatus for a belt type continuously variable transmission that is provided on a power transmission path between a drive power source and drive wheels in a vehicle and has a primary pulley, a secondary pulley, a belt that is wound around the primary pulley and the secondary pulley, a primary-pulley-side hydraulic cylinder that is used to change a width of a groove of the primary pulley, and a secondary-pulley-side hydraulic cylinder that is used to change a width of a groove of the secondary pulley, the control apparatus being adapted to change a speed ratio of the continuously variable transmission by operating the primary-pulley-side hydraulic cylinder so as to eliminate a deviation between a target speed ratio related value and an actual speed ratio related value and to control a belt clamping force by operating the secondary-pulley-side hydraulic cylinder so as to prevent slipping between the belt and the primary pulley and slipping between the belt and the secondary pulley, the control apparatus comprising:

a steady balance pressure calculating portion that calculates a steady balance pressure for maintaining the speed ratio constant;

a required shift pressure calculating portion that calculates a required shift pressure for changing the groove width of the primary pulley to change the speed ratio;

a primary hydraulic pressure calculating portion that, when the continuously variable transmission is to be shifted up, calculates a hydraulic pressure of the primary-pulley-side hydraulic cylinder based on the steady balance pressure and a higher of the required shift pressure calculated based on a rate of change in the target speed ratio related value and the required shift pressure calculated based on a rate of change in the actual speed ratio related value; and a base pressure setting portion that obtains a base pressure based on the hydraulic pressure of the primary-pulley-side hydraulic cylinder calculated by the primary hydraulic pressure calculating portion and the hydraulic pressure of the secondary-pulley-side hydraulic cylinder, and subsequently sets the hydraulic pressures of the primary-pulley-side hydraulic cylinder and the secondary-pulley-side hydraulic cylinder to the base pressure.

2. The control apparatus according to claim 1, wherein the base pressure setting portion sets the base pressure using a predetermined limit value as an upper limit of the base pressure such that the base pressure does not exceed an allowable load of the belt.

3. The control apparatus according to claim 1, wherein
the hydraulic pressure of the primary-hydraulic cylinder is comprised of the steady balance pressure for maintaining the speed ratio and the required shift pressure for changing the speed ratio, and the primary hydraulic pressure calculating portion calculates the required shift pressure by applying the higher of the rate of change in the target speed ratio related value and the rate of change in the actual speed ratio related value to a prestored arithmetic expression for calculating the required shift pressure.

4. A control method for a belt type continuously variable transmission that is provided on a power transmission path between a drive power source and drive wheels in a vehicle and has a primary pulley, a secondary pulley, a belt that is wound around the primary pulley and the secondary pulley, a primary-pulley-side hydraulic cylinder that is used to change a width of a groove of the primary pulley, and a secondary-pulley-side hydraulic cylinder that is used to change a width of a groove of the secondary pulley, wherein a speed ratio of the continuously variable transmission is changed by operating the primary-pulley-side hydraulic cylinder so as to eliminate a deviation between a target speed ratio related value and an actual speed ratio related value and a belt clamping force is controlled by operating the secondary-pulley-side hydraulic cylinder so as to prevent slipping between the belt and the primary pulley and slipping between the belt and the secondary pulley, the control method comprising the steps of:

calculating a steady balance pressure for maintaining the speed ratio constant;

calculating a required shift pressure for changing the groove width of the primary pulley to change the speed ratio;

calculating, when the continuously variable transmission is to be shifted up, a hydraulic pressure of the primary-pulley-side hydraulic cylinder based on the steady balance pressure and a higher of the required shift pressure calculated based on a rate of change in the target speed ratio related value and the required shift pressure calculated based on a rate of change in the actual speed ratio related value;

obtaining a base pressure based on the calculated hydraulic pressure of the primary-pulley-side hydraulic cylinder and the hydraulic pressure of the secondary-pulley-side hydraulic cylinder; and setting, after the obtaining the base pressure, the hydraulic pressures of the primary-pulley-side hydraulic cylinder and the secondary-pulley-side hydraulic cylinder to the base pressure.

5. The control method according to claim 4, wherein
the base pressure is set using a predetermined limit value as an upper limit of the base pressure such that the base pressure does not exceed an allowable load of the belt.

6. The control method according to claim 4, wherein
the required shift pressure that is used for changing the speed ratio and is a part of the hydraulic pressure of the primary-pulley-side hydraulic cylinder is calculated by applying the higher of the rate of change in the target speed ratio related value and the rate of change in the actual speed ratio related value to a prestored arithmetic expression for calculating the required shift pressure.

7. The control apparatus according to claim 1, wherein
the hydraulic pressure of the primary-pulley-side hydraulic cylinder is set to the calculated hydraulic pressure of the primary-pulley-side hydraulic cylinder.

8. The control method according to claim 4, further comprising:

setting the hydraulic pressure of the primary-pulley-side hydraulic cylinder to the calculated hydraulic pressure of the primary-pulley-side hydraulic cylinder.

* * * * *